(12) United States Patent
Hamaguchi et al.

(10) Patent No.: US 11,914,041 B2
(45) Date of Patent: Feb. 27, 2024

(54) DETECTION DEVICE AND DETECTION SYSTEM

(71) Applicant: IHI Corporation, Tokyo (JP)

(72) Inventors: Kenichi Hamaguchi, Tokyo (JP); Yosuke Seto, Tokyo (JP); Yoshihisa Yamanouchi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 507 days.

(21) Appl. No.: 17/056,511

(22) PCT Filed: Mar. 13, 2019

(86) PCT No.: PCT/JP2019/010324
§ 371 (c)(1),
(2) Date: Nov. 18, 2020

(87) PCT Pub. No.: WO2019/230122
PCT Pub. Date: Dec. 5, 2019

(65) Prior Publication Data
US 2021/0199804 A1    Jul. 1, 2021

(30) Foreign Application Priority Data

May 30, 2018    (JP) ................................ 2018-103926

(51) Int. Cl.
*G01S 17/50* (2006.01)
*G01S 17/89* (2020.01)
*G01S 7/02* (2006.01)

(52) U.S. Cl.
CPC .............. *G01S 17/50* (2013.01); *G01S 17/89* (2013.01); *G01S 7/022* (2013.01)

(58) Field of Classification Search
None
See application file for complete search history.

(56) References Cited

U.S. PATENT DOCUMENTS

| 5,432,547 A | 7/1995 | Toyama |
| 2014/0368493 A1* | 12/2014 | Rogan .................... G01S 17/50 |
| | | 345/419 |

(Continued)

FOREIGN PATENT DOCUMENTS

| CN | 102956104 A | 3/2013 |
| JP | 05-143892 A | 6/1993 |

(Continued)

OTHER PUBLICATIONS

"3D scanning", Wikipedia, Jan. 13, 2022, p. 1-p. 18.

*Primary Examiner* — Eric L Bolda
(74) *Attorney, Agent, or Firm* — Volpe Koenig

(57) ABSTRACT

A detection device, which detects a behavior of a vehicle in a preset detection area using a laser radar that generates point cloud information by irradiating the detection area with laser light and receiving reflected light resulting from the irradiation with the laser light, includes an acquisition unit configured to acquire the point cloud information, a vehicle detection unit configured to detect a vehicle on the basis of the point cloud information, and a behavior detection unit configured to detect a target behavior that is a vehicle behavior subjected to detection in response to the vehicle detected by the vehicle detection unit having moved from a first area to a second area, in which the first area and the second area are included in the detection area and are set according to the target behavior.

8 Claims, 23 Drawing Sheets

(56) References Cited

U.S. PATENT DOCUMENTS

| | | | |
|---|---|---|---|
| 2016/0110616 A1 | 4/2016 | Kawasaki et al. | |
| 2016/0356880 A1* | 12/2016 | Negussu | G01S 7/022 |
| 2017/0025003 A1 | 1/2017 | Arpin et al. | |
| 2021/0011164 A1* | 1/2021 | Sadek | G08G 1/096741 |
| 2021/0122369 A1* | 4/2021 | Chen | B60R 21/00 |

FOREIGN PATENT DOCUMENTS

| | | |
|---|---|---|
| JP | 06-052485 A | 2/1994 |
| JP | 06-096385 A | 4/1994 |
| JP | 06-187591 A | 7/1994 |
| JP | 10-269492 A | 10/1998 |
| JP | 2000-020879 A | 1/2000 |
| JP | 2003-141679 A | 5/2003 |
| JP | 2003-331388 A | 11/2003 |
| JP | 2005-107934 A | 4/2005 |
| JP | 2007-139650 A | 6/2007 |
| JP | 2009-258989 A | 11/2009 |
| JP | 2010-032429 A | 2/2010 |
| JP | 2010-211632 A | 9/2010 |
| JP | 2013-045249 A | 3/2013 |
| JP | 2016-045915 A | 4/2016 |
| JP | 6007395 B2 | 10/2016 |
| JP | 6165120 B2 | 7/2017 |
| JP | 6280659 B2 | 2/2018 |
| WO | 2013/128427 A1 | 9/2013 |

* cited by examiner

Fig.10

| VEHICLE ID | DETECTION TIME INFORMATION | FIRST ENTRY INFORMATION | SECOND ENTRY INFORMATION |
|---|---|---|---|
| 1001 | 2018/5/10 10:29:06.550 | 1 | 0 |
| 1002 | 2018/5/10 10:29:24.278 | 1 | 0 |
| 1003 | 2018/5/10 10:29:33.014 | 1 | 1 |
| ⋮ | ⋮ | ⋮ | ⋮ |

DETECTION DEVICE AND DETECTION SYSTEM

TECHNICAL FIELD

The present disclosure relates to a detection device and a detection system.

BACKGROUND ART

A technique for detecting the behavior of the vehicle has been known. For example, Patent Literature 1 describes a vehicle monitoring device that extracts a candidate vehicle from an input image captured by an imaging device provided at a position overlooking the road and determines whether the vehicle is a normal vehicle or a wrong-way traveling vehicle according to the displacement of feature points of the candidate vehicle.

CITATION LIST

Patent Literature

Patent Literature 1: Japanese Unexamined Patent Publication No. H10-269492

SUMMARY OF INVENTION

Technical Problem

The vehicle monitoring device described in Patent Literature 1 calculates position information of the vehicle from the image by image processing in order to detect the behavior of the vehicle. Images captured by a camera or the like are susceptible to disturbances in the imaging environment. Therefore, the position information acquired on the basis of the image may not have sufficient accuracy. Further, the vehicle monitoring device described in Patent Literature 1 determines the direction of travel from the displacement of the feature points and determines whether the vehicle is a normal vehicle or a wrong-way traveling vehicle but if, for example, the displacement is small, false detection may occur. In this technical field, it is desired to improve the accuracy of detection of a vehicle behavior.

The present disclosure describes a detection device capable of improving the accuracy of detection of the vehicle behavior.

Solution to Problem

A detection device according to an aspect of the present disclosure is a device for detecting a target behavior that is a vehicle behavior subjected to detection in a preset detection area by using a laser radar that irradiates the detection area with laser light and receives reflected light of the laser light to generate point cloud information. The detection device includes an acquisition unit configured to acquire the point cloud information, a vehicle detection unit configured to detect a vehicle on the basis of the point cloud information, and a behavior detection unit configured to detect a target behavior in response to the vehicle detected by the vehicle detection unit having moved from a first area to a second area. The first area and the second area are included in the detection area and are set according to the target behavior.

Effects of Invention

According to the present disclosure, it is possible to improve the accuracy of detection of the vehicle behavior.

BRIEF DESCRIPTION OF DRAWINGS

FIG. 10 is a diagram illustrating an example of a management table.

DESCRIPTION OF EMBODIMENTS

[1] Outline of the Embodiment

Figure 1:
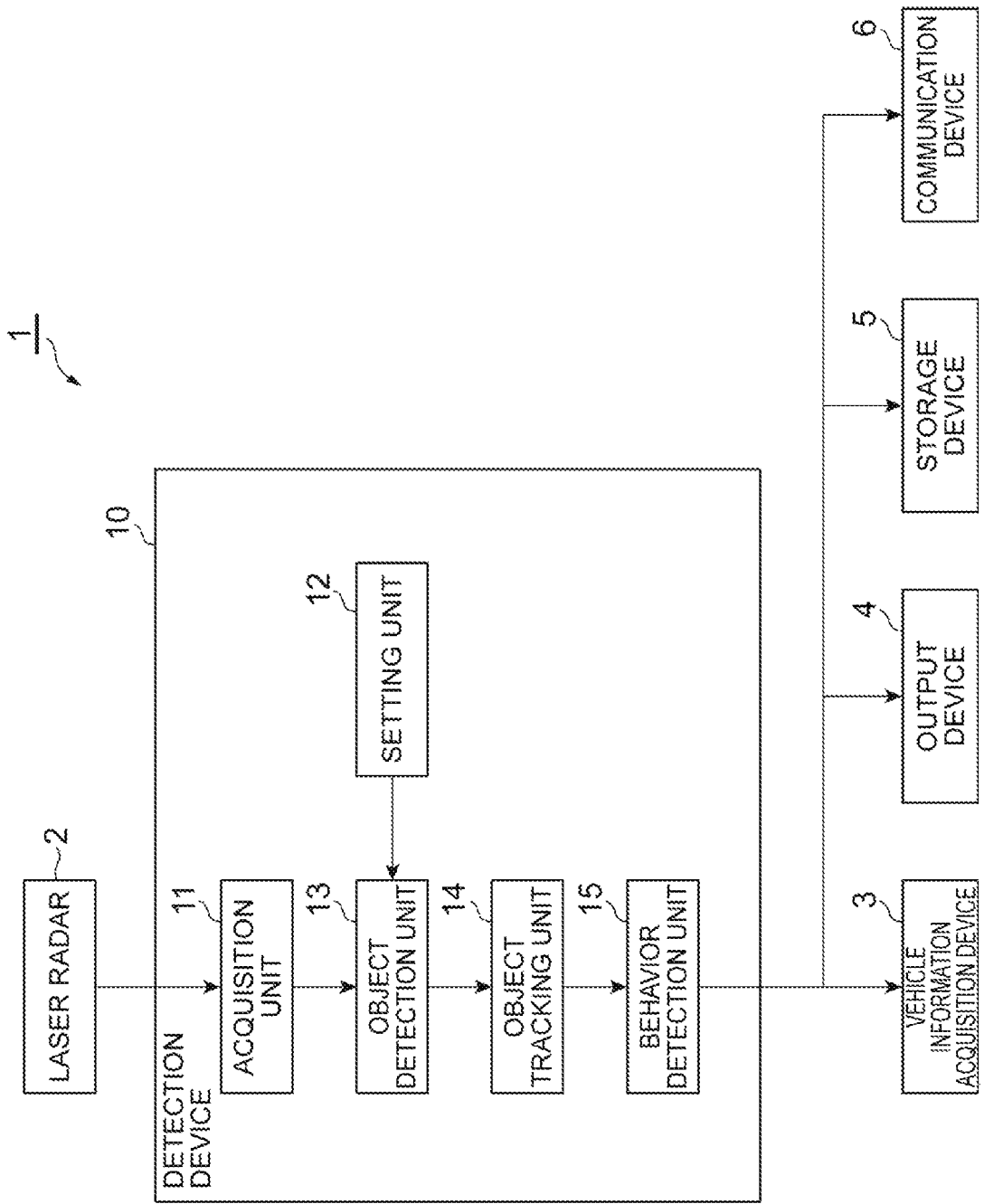
FIG. 1 is a diagram schematically illustrating a configuration of a detection system including a detection device according to an embodiment.

A detection device according to an aspect of the present disclosure is a device for detecting a target behavior that is a vehicle behavior subjected to detection in a preset detection area by using a laser radar that irradiates the detection area with laser light and receives reflected light of the laser light to generate point cloud information. The detection device includes an acquisition unit configured to acquire the point cloud information, a vehicle detection unit configured to detect a vehicle on the basis of the point cloud information, and a behavior detection unit configured to detect a target behavior in response to the vehicle detected by the vehicle detection unit having moved from a first area to a second area. The first area and the second area are included in the detection area and are set according to the target behavior.

The detection device detects the vehicle using the point cloud information generated by the laser radar. The point cloud information generated on the basis of the reflected light of the laser light is less susceptible to light intensity, weather conditions, and the like, so that the vehicle can be detected with high accuracy according to the point cloud information. Further, the detection device detects the target behavior in response to the detected vehicle moving from the first area to the second area. Thus, the target behavior is detected by the movement of the vehicle from the first area to the second area regardless of an amount of movement of the vehicle per unit time, so that the target behavior can be detected more reliably. As a result, it is possible to improve the accuracy of detection of the vehicle behavior.

The vehicle detection unit may calculate position information indicating the position of the vehicle on the basis of the point cloud information. The behavior detection unit may determine whether the vehicle has moved from the first area to the second area on the basis of the position information. In this case, it is possible to simplify the determination as to whether the vehicle has moved from the first area to the second area since the vehicle position information is used.

The behavior detection unit may determine that the vehicle has moved from the first area to the second area when the position of the vehicle is included in the second area after the position of the vehicle is included in the first area. In this case, it is determined whether the vehicle exists in each area depends on whether the position of the vehicle is included in each area. Thus, it is possible to simplify the determination of the movement from the first area to the second area.

A first line may be set for the first area, and a second line may be set for the second area. The behavior detection unit may determine that the vehicle has moved from the first area to the second area when the vehicle crosses the second line after the vehicle has crossed the first line. In this case, it is determined whether the vehicle has entered each area depending on whether the vehicle has crossed each line. Thus, it is possible to detect that the vehicle has entered or passed through each area regardless of the speed of the vehicle. As a result, it is possible to further improve the accuracy of detection of the vehicle behavior.

In the detection area, a third area may be further set between the first area and the second area according to the target behavior. The behavior detection unit may detect the target behavior in response to the vehicle moving in the order of the first area, the third area, and the second area. In this case, false detection can be reduced, and the accuracy of detection of the target behavior can further be improved.

When the target behavior is a behavior that constitutes a traffic violation, the behavior detection unit may output an acquisition command that causes an external device to acquire vehicle information to identify the vehicle that has performed the target behavior. In this case, the vehicle information for identifying the traffic violation vehicle is acquired. Accordingly, it is possible, for example, to impose penalty points on and collect fines from the driver of a traffic violation vehicle.

A detection system according to another aspect of the present disclosure includes the detection device described above and a laser radar. Since this detection system includes the above-described detection device, it is possible to improve the accuracy of detection of the vehicle behavior.

[2] Exemplification Embodiment

Hereinafter, an embodiment of the present disclosure is described with reference to the accompanying drawings. In the description of the drawings, the same elements are denoted by the same reference signs and duplicate explanations are omitted.

Figure 2:
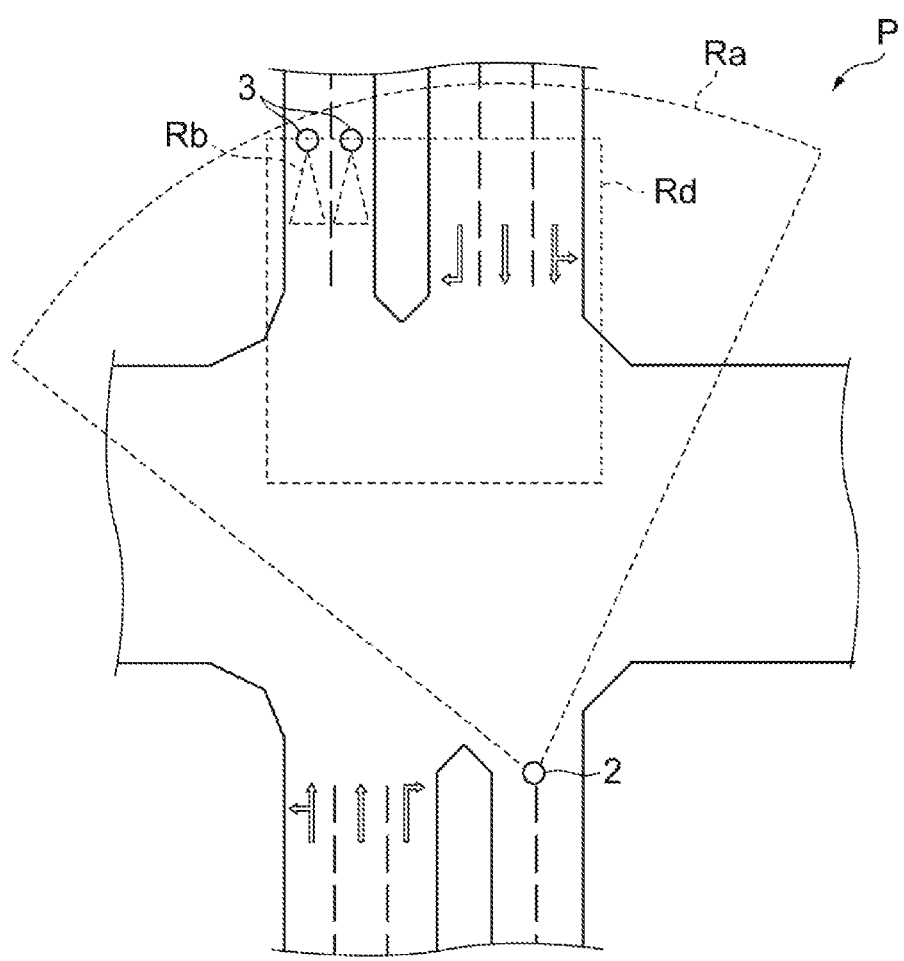
FIG. 2 is a diagram illustrating an arrangement example of a laser radar and a vehicle information acquisition device illustrated in FIG. 1.
Figure 3:
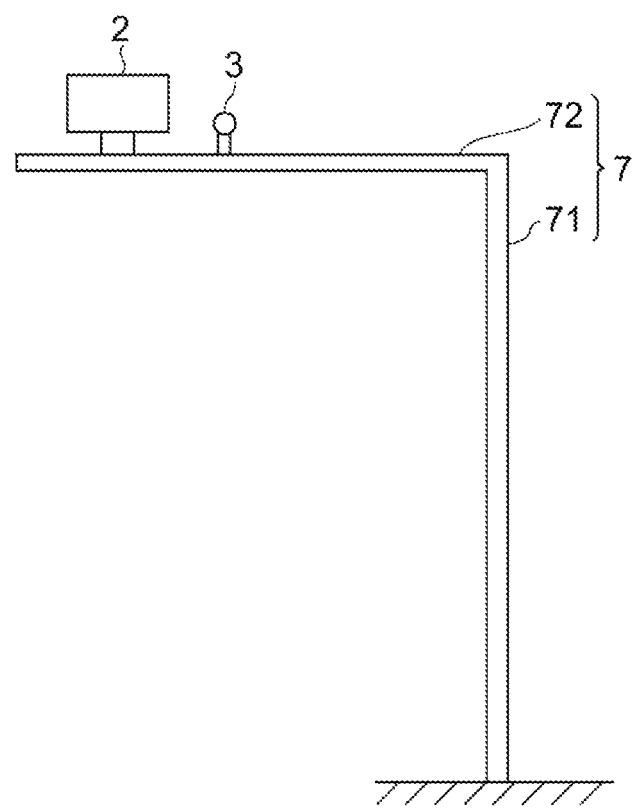
FIG. 3 is a diagram illustrating an installation example of the laser radar and the vehicle information acquisition device.
Figure 4:
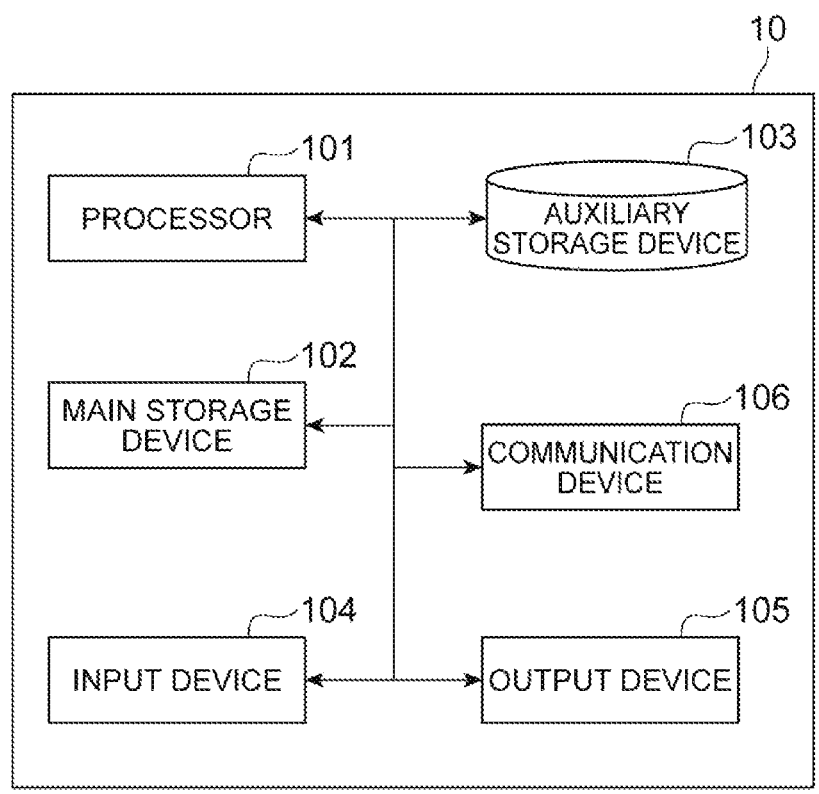
FIG. 4 is a diagram illustrating a hardware configuration of the detection device illustrated in FIG. 1.

FIG. 1 is a diagram schematically illustrating a configuration of a detection system including a detection device according to an embodiment. FIG. 2 is a diagram illustrating an arrangement example of a laser radar and a vehicle information acquisition device illustrated in FIG. 1. FIG. 3 is a diagram illustrating an installation example of the laser radar and the vehicle information acquisition device. FIG. 4 is a diagram illustrating a hardware configuration of the detection device illustrated in FIG. 1.

The detection system 1 illustrated in FIG. 1 is a system that detects the behavior of a vehicle at a target point. More specifically, the detection system 1 detects the target behavior of the vehicle. The target point is a location (point) on the road to be monitored. An arbitrary location on the road can be selected as the target point. For example, an intersection, a confluence point, or a point in the middle of the road is selected as the target point. Examples of vehicles include automobiles and motorcycles.

The target behavior is the vehicle behavior subjected to detection in a detection area Rd described later. The target behavior includes (traffic) violation traveling. Examples of the violation traveling include, for example, U-turns in areas where U-turns are prohibited, right (or left) turns in areas where right turns (or left turns) are prohibited at intersections, traveling in the opposite direction from the permitted direction of traffic of the vehicle on the road (hereinafter, "wrong-way traveling"), lane changes in areas where lane changes are prohibited, and violations of the designated traffic classification. The detection system 1 is used for an intelligent transport systems (ITS). The detection system 1 includes a laser radar 2, a vehicle information acquisition device 3 (external device), an output device 4, a storage device 5, a communication device 6, and a detection device 10.

The laser radar 2 is a device that generates point cloud information. The laser radar 2 is also referred to as a light detection and ranging (LiDAR) or a laser range finder. As illustrated in FIGS. 2 and 3, the laser radar 2 is installed near the target point. The laser radar 2 is provided, for example, above the target point. The laser radar 2 is fixed to a support member 7 installed on the ground. For example, the support member 7 is provided on the roadside near the intersection P. The support member 7 includes, for example, a post 71 standing on the roadside, and an arm 72 that extends from the upper end of the post 71 in a direction crossing the road. The laser radar 2 is installed on the arm 72. The support member 7 may be, for example, a utility pole and a warehouse wall. The illustration of the support member 7 is omitted in, for example, FIG. 2.

The laser radar 2 emits laser light toward an irradiation possible range Ra and receives the reflected light of the emitted laser light to generate point cloud information. The irradiation possible range Ra is a range in which the laser radar 2 can irradiate the laser light and is, for example, about 150 meters. The irradiation possible range Ra includes a detection area Rd. The detection area Rd is an area to be monitored in the irradiation possible range Ra. The point cloud information is a set of measurement point information of each measurement point included in the irradiation possible range Ra.

The measurement point information includes time information and position information. The time information is information indicating time when the measurement point information is generated (the reflected light is received) for the measurement point indicated by the position information. The position information is information indicating the position of the measurement point. For the position, a polar coordinate system expressed in terms of yaw angle, pitch angle, and depth may be used, and a three-dimensional coordinate system of X coordinates, Y coordinates, and Z coordinates may be used. As the coordinates of each measurement point, for example, the coordinates in which the position of the laser radar 2 is the origin are used. The measurement point information may further include reflection intensity information. The reflection intensity information is information indicating the intensity of the reflected light received from the measurement point indicated by the position information at the time indicated by the time information.

The laser radar 2 scans the irradiation possible range Ra with the laser light in the main scanning direction and the sub scanning direction. The point cloud information acquired by irradiating the irradiation possible range Ra with the laser light may be referred to as one frame. The irradiation of the irradiation possible range Ra with the laser light is repeated at predetermined time intervals. The laser radar 2 transmits the generated point cloud information to the detection device 10.

The vehicle information acquisition device 3 is a device that acquires vehicle information for identifying the vehicle determined by the detection device 10 as having performed the target behavior. The vehicle information acquisition device 3 is, for example, an automatic speed violation enforcement device. As the vehicle information, an image of a license plate, for example, is used. When the vehicle information acquisition device 3 receives an acquisition command along with vehicle position information from the detection device 10, the vehicle information acquisition device 3 acquires an image of the license plate by, for example, capturing an image so as to include the license plate of the vehicle (the vehicle to be acquired) that exists at the position indicated by the vehicle position information. When the vehicle to be acquired enters monitoring range Rb, the vehicle information acquisition device 3 captures an image of the vehicle. The monitoring range Rb is a range in which the vehicle information acquisition device 3 can capture images and the range is in about several meters.

The vehicle information acquisition device 3 is fixed to the support member 7 similarly to the laser radar 2. The laser radar 2 and the vehicle information acquisition device 3 may be installed on the same support member 7 or different support members 7. The illustration of the support member 7 is omitted in, for example, FIG. 2. The vehicle information acquisition device 3 may transmit the vehicle information to the storage device 5 and store the vehicle information in the storage device 5. The vehicle information acquisition device 3 may transmit the vehicle information to a public organization, a road management company, or the like via the communication device 6.

The output device 4 is a device that gives cautions, warnings, and instructions. The output device 4 includes, for example, a display board and a loud speaker. When receiving the output command from the detection device 10, the output device 4 outputs the caution, warning, instruction, and the like to the driver of the violating vehicle. The output device 4 may output the caution, warning, instruction, and the like to pedestrians and the like in the surroundings.

The storage device 5 is a device that stores various kinds of information. Examples of the storage device 5 include a hard disk device and a semiconductor memory. Various kinds of information stored in the storage device 5 include, for example, the vehicle information acquired by the vehicle information acquisition device 3, and detection time, position, speed, and size (dimensions) of the detected vehicle as described below. When the vehicle information acquisition device 3 includes a video camera, the various kinds of information may include a video image of a time period including the detection time. The various kinds of information may include point cloud information of a time period including the detection time. The various kinds of information may include a trajectory of movement of the detected vehicle (vehicle position information in time series).

The communication device 6 is a communication facility installed at the side of the road. The communication device 6 is, for example, a roadside device (ITS spot). The communication device 6 communicates with an external device outside the detection system 1. Examples of the external device include an on-vehicle device, a server device, and other systems and the like. The communication device 6 transmits information similar to the various kinds of information stored in the storage device 5 to the external device.

The detection device 10 is a device that detects the behavior of the vehicle in the detection area Rd using the laser radar 2. The detection device 10 is constituted of, for example, an information processing device such as a computer.

As illustrated in FIG. 4, the detection device 10 may physically be configured as a computer including hardware constituted of one or more processors 101, a main storage device 102 such as a random access memory (RAM) and a read only memory (ROM), an auxiliary storage device 103 such as a hard disk device, an input device 104 such as a keyboard, an output device 105 such as a display, a communication device 106 which is a data transmission and reception device, such as a network interface card (NIC), and a wireless communication module, and the like. Each of the functions illustrated in FIG. 1 of the detection device 10 is implemented by loading one or more predetermined computer programs into the hardware, such as the main storage device 102, to operate each hardware under the control of the one or more processors 101, as well as to read and write data in the main storage device 102 and the auxiliary storage device 103.

The detection device 10 functionally includes an acquisition unit 11, a setting unit 12, an object detection unit 13 (vehicle detection unit), an object tracking unit 14, and a behavior detection unit 15.

The acquisition unit 11 acquires the point cloud information from the laser radar 2. The acquisition unit 11 outputs the acquired point cloud information to the object detection unit 13.

The setting unit 12 acquires area information indicating the detection area Rd. For example, the user sets the detection area Rd using the input device 104 of the detection device 10. For example, a three-dimensional space simulating the target point is displayed on the output device 105, and the user sets the detection area Rd using a frame or the like. For example, the detection area Rd is set so as not to include the sidewalk. Intersections and streets are equipped with fixed objects such as traffic lights, posts, utility poles, and overhead structures. Since these fixed objects are not to be monitored, a range below a predetermined height may be set as the height of the detection area Rd to exclude these fixed objects. In addition, the range above the predetermined height may be set as the height of the detection area Rd to exclude the ground. For example, a range from 20 cm to 500 cm may be set for the height of the detection area Rd with respect to the ground surface. The setting unit 12 acquires area information indicating the set detection area Rd and outputs the acquired area information to the object detection unit 13.

The object detection unit 13 detects a vehicle on the basis of the point cloud information. Specifically, when the object detection unit 13 receives the point cloud information from the acquisition unit 11, the object detection unit 13 excludes, from the point cloud information, the measurement point information of the measurement points located outside the detection area Rd indicated by the area information received from the setting unit 12. The object detection unit 13 clusters the remaining point cloud information. In other words, the object detection unit 13 connects neighboring measurement points among a plurality of measurement points in the detection area Rd and divides them into clusters (lumps). The object detection unit 13 detects each of the acquired clusters as a single detected object (vehicle, person, or the like).

The object detection unit 13 calculates dimensions (width, depth, and height) and position of the detected object. The position of the detected object may be provided as the coordinates of the four corners (front right end, front left end, rear right end, and rear left end) of the detected object, the average of the positions of the measurement point information included in the cluster, or the position of the center of gravity of the detected object. The position of the detection object may also be provided as the coordinates of the front right end and the front left end, or the coordinates of the measurement point closest to the laser radar 2.

Since the detection device 10 detects the behavior of the vehicle, it is not necessary to track moving objects (non-vehicles) such as persons and birds. Therefore, the object detection unit 13 excludes the non-vehicles from the detected objects. Specifically, the object detection unit 13 classifies the detected objects on the basis of the size (dimensions) of the detected objects. Here, the object detection unit 13 classifies the detected objects into vehicles and non-vehicles. For example, the object detection unit 13 classifies the detected object as a non-vehicle when the width of the detected object is less than 1 meter, and classifies the detected object as a vehicle when the width of the detected object is at least 1 meter.

The object detection unit 13 outputs the detection result of the detected object classified as a vehicle (hereinafter referred to as the "detected vehicle") to the object tracking unit 14. The detection result includes dimensional information indicating the dimensions of the detected vehicle, vehicle position information indicating the position of the detected vehicle, and detection time information indicating the detection time when the detected vehicle is detected. The detection time is, for example, the average time of the times indicated by the time information in the measurement point information of the measurement points included in the cluster.

The object tracking unit 14 tracks the detected vehicle and generates a tracking result. In other words, when the object tracking unit 14 receives the detection result from the object detection unit 13, the object tracking unit 14 maps a vehicle identifier (ID) to the detected vehicle detected in different frames (different detection times). The vehicle ID is identification information that can uniquely identify the detected vehicle. Specifically, the object tracking unit 14 determines whether the detected vehicle detected in the current frame corresponds to any one of the detected vehicles in the past frames, on the basis of the position and dimensions of the detected vehicle and the speed, angular velocity, and the like estimated from past observations.

When the object tracking unit 14 determines that the detected vehicle detected in the current frame does not correspond to any one of the detected vehicles detected in the past frames, the object tracking unit 14 assigns the detected vehicle with a new vehicle ID as a new detected vehicle. When the object tracking unit 14 determines that the detected vehicle detected in the current frame corresponds to the detected vehicle detected in the past frame, the object tracking unit 14 assigns the detected vehicle detected in the current frame with the vehicle ID assigned to the corresponding detected vehicle. The object tracking unit 14 deletes the vehicle ID of the detected vehicle that has not been detected for a long time among the detected vehicles to which the vehicle ID has been assigned.

The problem of tracking (assigning ID to) a plurality of detected vehicles is called a multi-target tracking problem. The object tracking unit 14 tracks each detected vehicle using a known algorithm. Known algorithms include the suboptimal nearest neighbor (SNN), the global nearest neighbor (GNN), the joint probabilistic data association filter (JPDAF), and the like. The object tracking unit 14 outputs the tracking result to the behavior detection unit 15. The tracking result includes the vehicle ID, the vehicle position information, and the detection time information.

The behavior detection unit 15 detects the target behavior of the detected vehicle on the basis of the vehicle ID and the vehicle position information. When the behavior detection unit 15 receives the tracking result from the object tracking unit 14, the behavior detection unit 15 determines whether the detected vehicle has moved from an area Rin (first area) to an area Rout (second area) on the basis of the vehicle position information. For example, when the position of the detected vehicle is included in the area Rout after being included in the area Rin, the behavior detection unit 15 determines that the detected vehicle has moved from the area Rin to the area Rout. The behavior detection unit 15 determines that the detected vehicle has performed the target behavior by determining that the vehicle has moved from the area Rin to the area Rout. The area Rin and the area Rout are included in the detection area Rd and are set in advance according to the target behavior.

Figure 5:
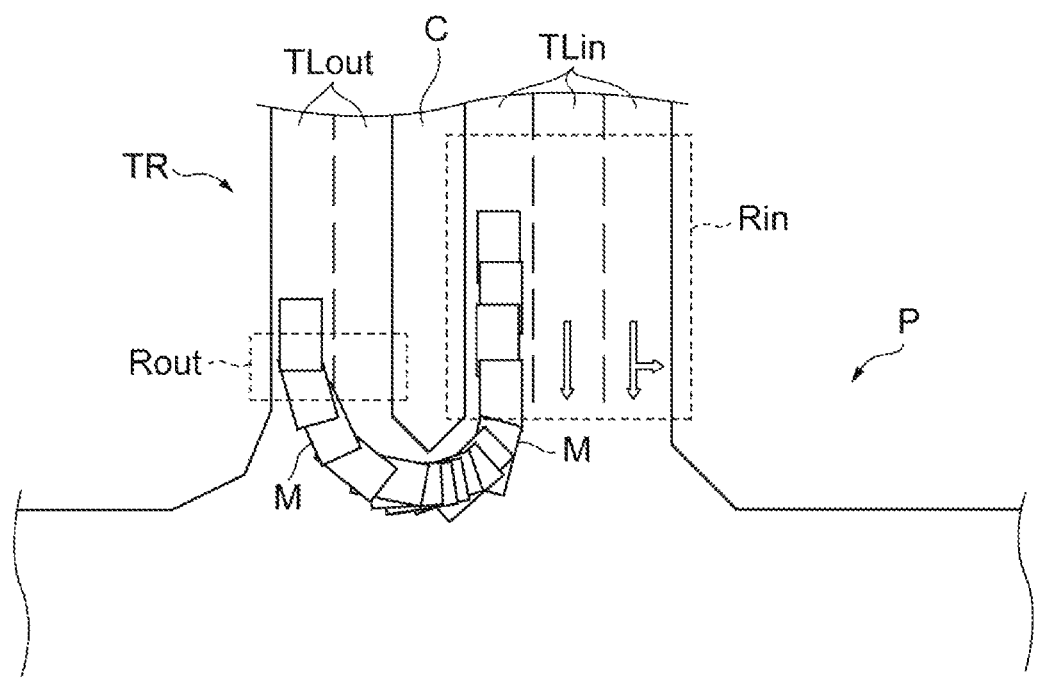
FIG. 5 is a diagram for explaining detection of a U-turn.

In a case where the target behavior is a U-turn at the intersection P, the area Rin and the area Rout are set as described below. The U-turn, which is also called turning, means that the vehicle travels in the opposite direction by changing the direction of travel by 180 degrees. As illustrated in FIG. 5, a road TR extending from the intersection P has a plurality of (here, three) lanes (travel lanes) TLin entering the intersection P, a plurality of (here, two) lanes TLout exiting the intersection P, and a median strip C provided between the lanes TLin and the lanes TLout. On the road TR, the area Rin is set over all lanes TLin, and the area Rout is set over all lanes TLout. Details of the detection processing by the behavior detection unit 15 will be described later. When the target behavior is detected, the behavior detection unit 15 outputs an acquisition command for acquiring vehicle information to the vehicle information acquisition device 3.

Figure 6:
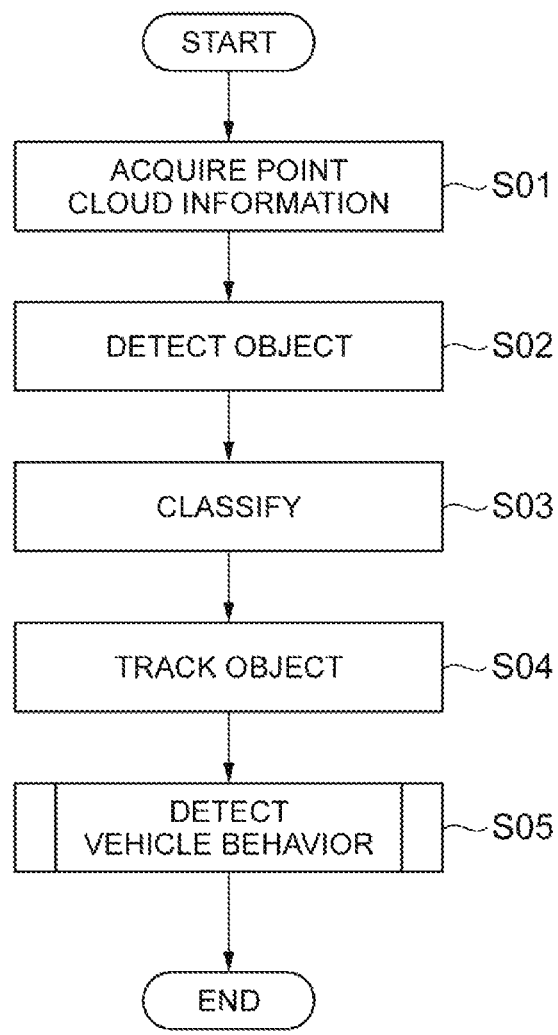
FIG. 6 is a flowchart illustrating a series of processing steps of a detection method carried out by the detection device.
Figure 7:
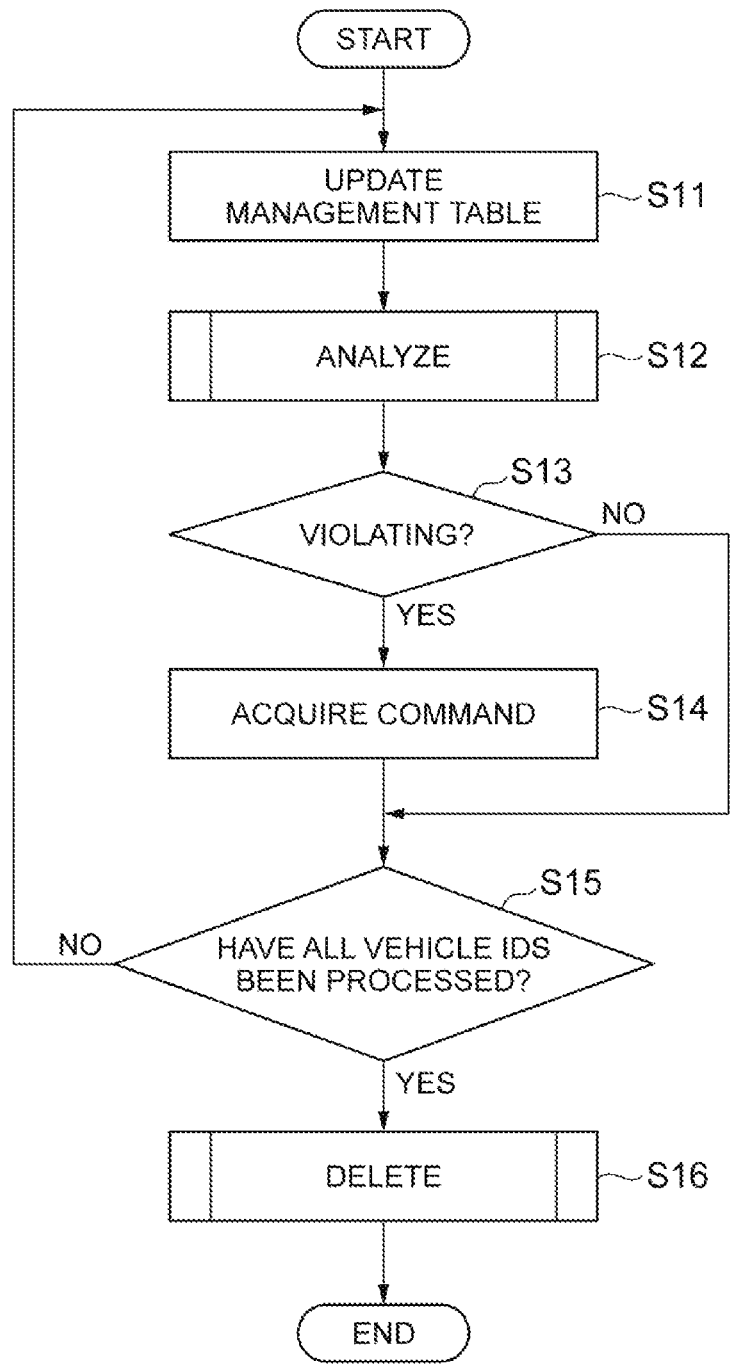
FIG. 7 is a flowchart illustrating in detail the vehicle behavior detection processing of FIG. 6.
Figure 8:
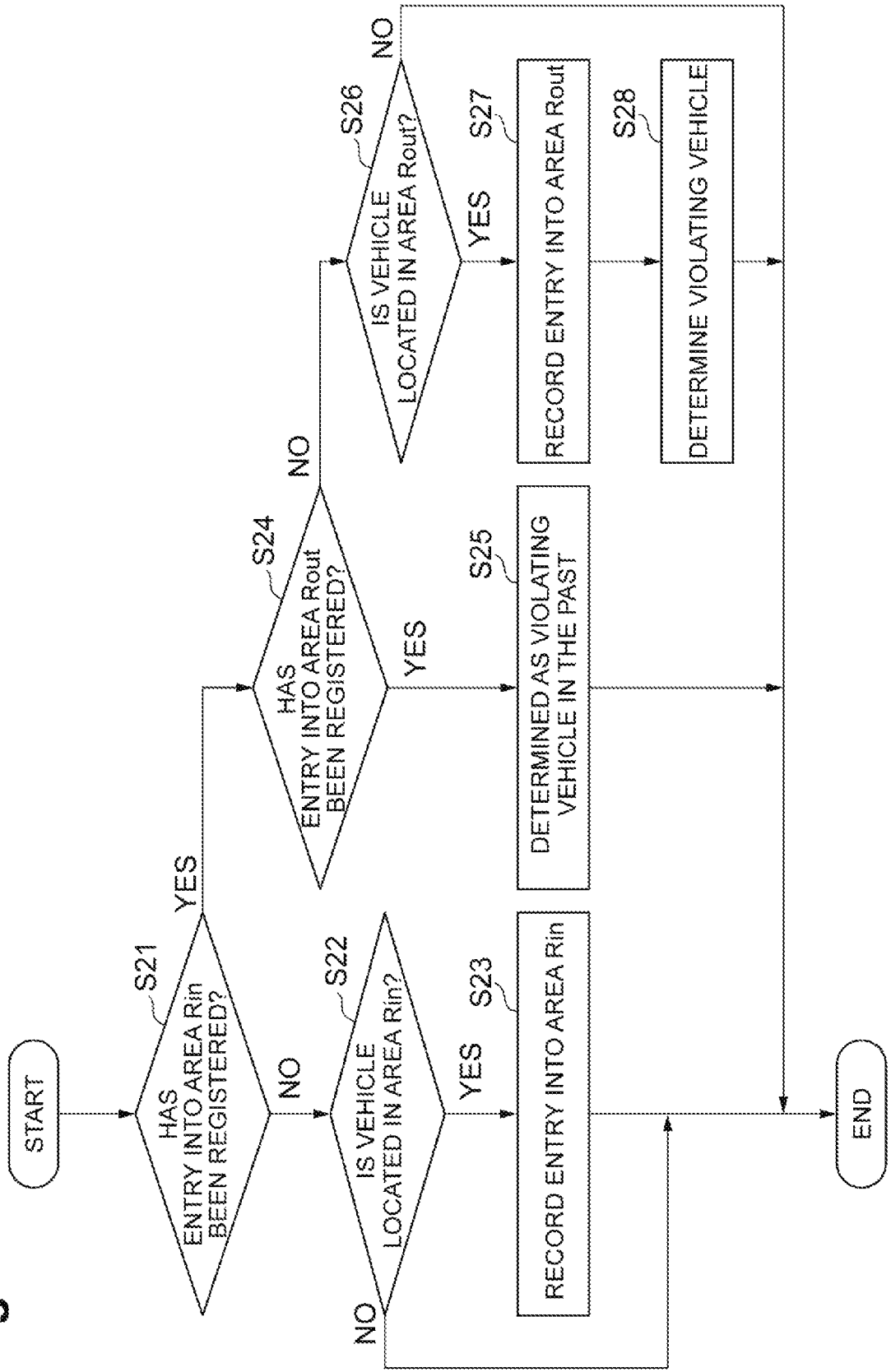
FIG. 8 is a flowchart illustrating in detail the analysis processing of FIG. 7.
Figure 9:
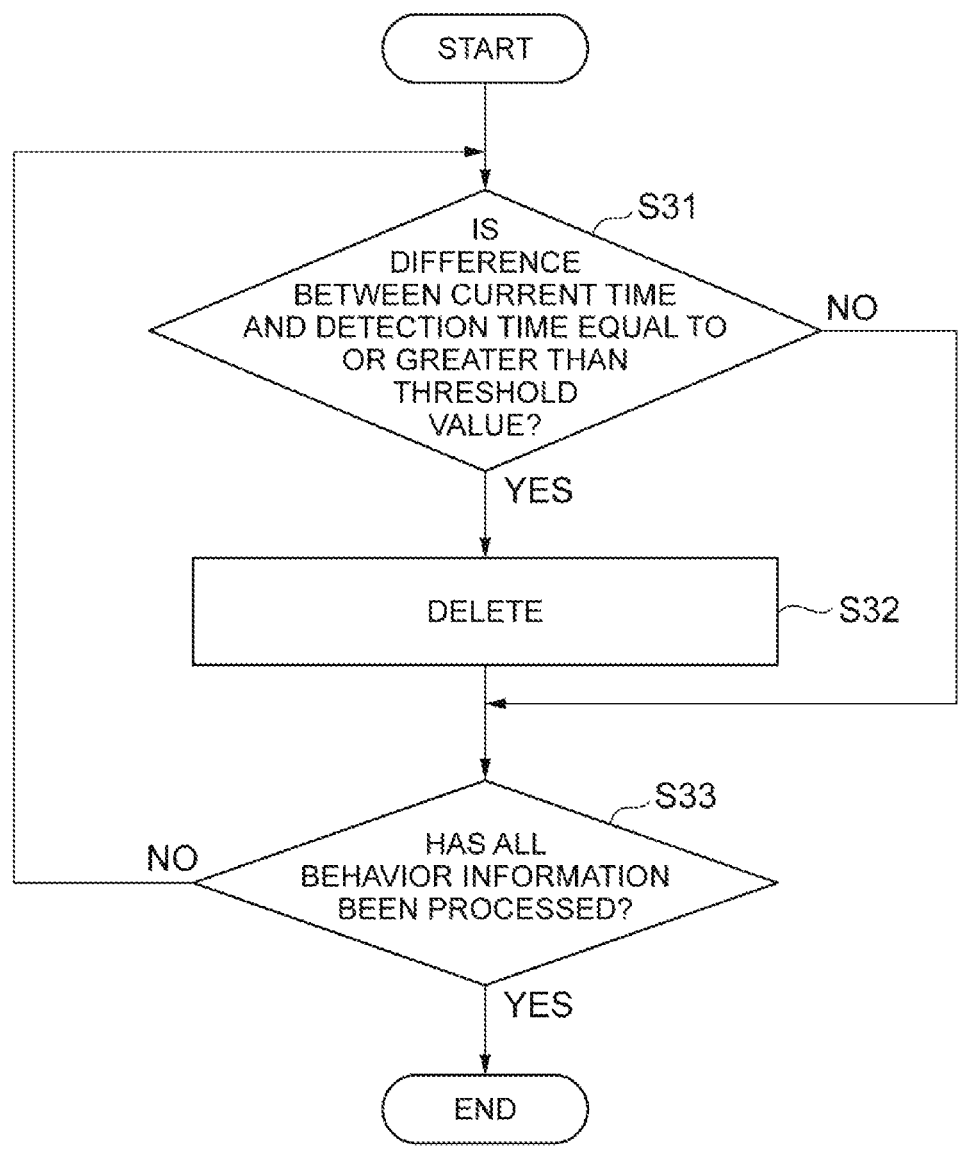
FIG. 9 is a flowchart illustrating in detail the deletion processing of FIG. 7.

Next, a detection method performed by the detection device 10 is described. FIG. 6 is a flowchart illustrating a series of processing steps of a detection method performed by the detection device. FIG. 7 is a flowchart illustrating in detail the vehicle behavior detection processing of FIG. 6. FIG. 8 is a flowchart illustrating in detail the analysis processing of FIG. 7. FIG. 9 is a flowchart illustrating in detail the deletion processing of FIG. 7. FIG. 10 is a diagram illustrating an example of the management table. The series of processing steps illustrated in FIG. 6 is performed, for example, at regular intervals.

First, the acquisition unit 11 acquires point cloud information from the laser radar 2 (step S01). Then, the acquisition unit 11 outputs the acquired point cloud information to the object detection unit 13. Then, the object detection unit 13 detects a detected object on the basis of the point cloud information (step S02). Specifically, when the object detection unit 13 receives the point cloud information from the acquisition unit 11, the object detection unit 13 excludes, from the point cloud information, the measurement point information of the measurement points located outside the detection area Rd indicated by the area information received from the setting unit 12. Then, the object detection unit 13 clusters the remaining point cloud information, and detects each of the acquired clusters as a single detected object (vehicle, person, or the like). Then, the object detection unit 13 calculates the dimensions and positions of the detected objects.

Then, the object detection unit 13 classifies the detected objects (step S03). Specifically, the object detection unit 13 classifies the detected objects into vehicles or non-vehicles on the basis of the size of the detected objects. Then, the object detection unit 13 outputs the detection result of the detected objects classified as vehicles to the object tracking unit 14.

Subsequently, the object tracking unit 14 tracks the detected object (detected vehicle) (step S04). Specifically, when the object tracking unit 14 receives the detection result from the object detection unit 13, the object tracking unit 14 assigns the detected vehicle with a new vehicle ID as a new detected vehicle in a case where the object tracking unit 14 determines that the detected vehicle detected in the current frame does not correspond to any of the detected vehicles detected in the past frames. In a case where the object tracking unit 14 determines that the detected vehicle detected in the current frame corresponds to the detected vehicle detected in the past frame, the object tracking unit 14 assigns the detected vehicle detected in the current frame with the vehicle ID assigned to the corresponding detected vehicle. Then, the object tracking unit 14 outputs the tracking result (the vehicle ID, the vehicle position information, and the detection time information) to the behavior detection unit 15.

Subsequently, the behavior detection unit 15 carries out vehicle behavior detection processing (step S05). In the vehicle behavior detection processing of step S05, as illustrated in FIG. 7, when the behavior detection unit 15 receives the tracking result from the object tracking unit 14, the behavior detection unit 15 carries out the processing steps S11 to S14 for each vehicle ID included in the tracking result. First, the behavior detection unit 15 updates the management table (step S11). The management table is a table for managing the detected vehicles.

As illustrated in FIG. 10, the management table manages behavior information by associating the vehicle ID, the detection time information, first entry information, and second entry information. The detection time information can be expressed in for example, UNIX (registered trademark) time. The UNIX (registered trademark) time is the time expressed in seconds or milliseconds elapsed since 00:00:00, Jan. 1, 1970. For example, the detection time of the vehicle ID "1001" illustrated in FIG. 10 is represented by "1525915746550". The first entry information is information indicating whether the detected vehicle indicated by the vehicle ID has entered the area Rin. When the first entry information is "0", it indicates that the detected vehicle has not entered the area Rin. When the first entry information is "1", it indicates that the detected vehicle has entered the area Rin. Similarly, the second entry information is information indicating whether the detected vehicle indicated by the vehicle ID has entered the area Rout. When the second entry information is "0", it indicates that the detected vehicle has not entered the area Rout. When the second entry information is "1", it indicates that the detected vehicle has entered the area Rout.

When there is no behavior information including the vehicle ID included in the tracking result in the management table, the behavior detection unit 15 additionally registers the behavior information including the vehicle ID in the management table. In other words, the behavior detection unit 15 adds new behavior information, sets the vehicle ID and the detection time information included in the tracking result as the vehicle ID and the detection time information of the behavior information, and sets the first entry information and the second entry information to "0". When there is the behavior information including the vehicle ID included in the tracking result in the management table, the behavior detection unit 15 overwrites (updates) the detection time information of the behavior information with the detection time information included in the tracking result.

Then, the behavior detection unit 15 carries out the analysis processing (step S12). In the analysis processing of step S12, as illustrated in FIG. 8, the behavior detection unit 15 first refers to the first entry information of the behavior information of the vehicle ID in question and determines whether the entry of the vehicle into the area Rin has been registered (step S21). When the behavior detection unit 15 determines that the entry into the area Rin has not been registered (step S21; NO), the behavior detection unit 15 determines whether the detected vehicle is located in the area Rin (step S22). Specifically, the behavior detection unit 15 determines whether the position indicated by the vehicle position information included in the tracking result is included in the area Rin.

When the behavior detection unit 15 determines that the detected vehicle is located in the area Rin (step S22; YES), the behavior detection unit 15 sets the first entry information to a value (here, "1") indicating the entry into the area Rin (step S23) and ends the analysis processing of step S12. On the other hand, in step S22, when the behavior detection unit 15 determines that the detected vehicle is not located within the area Rin (step S22; NO), the behavior detection unit 15 leaves the first entry information as it is (here, "0") and ends the analysis processing of step S12.

In step S21, when the behavior detection unit 15 determines that entry of the vehicle into the area Rin (step S21; YES) has been registered, the behavior detection unit 15 refers to the second entry information of the behavior information of the vehicle ID in question and determines whether the entry into the area Rout has been registered (step S24). When the behavior detection unit 15 determines that the entry into the area Rout has been registered (step S24; YES), the behavior detection unit 15 determines that the detected vehicle indicated by the vehicle ID has been determined as a violating vehicle in the past (step S25), and ends the analysis processing of step S12.

On the other hand, in step S24, when the behavior detection unit 15 determines that the entry into the area Rout has not been registered (step S24; NO), the behavior detection unit 15 determines whether the detected vehicle is located in the area Rout (step S26). Specifically, the behavior detection unit 15 determines whether the position indicated by the vehicle position information included in the tracking result is included in the area Rout. When the behavior detection unit 15 determines that the detected vehicle is located in the area Rout (step S26; YES), the behavior detection unit 15 sets the second entry information to a value indicating the entry into the area Rout (here, "1") (step S27), and determines that the detected vehicle is a violating vehicle (step S28). Then, the behavior detection unit 15 ends the analysis processing of step S12.

On the other hand, in step S26, when the behavior detection unit 15 determines that the detected vehicle is not located in the area Rout (step S26; NO), the behavior detection unit 15 leaves the second entry information as it is (here, "0"), and ends the analysis processing of step S12.

Subsequently, when the behavior of the detected vehicle is determined to be a violation in step S12 (step S13; YES), the behavior detection unit 15 transmits, to the vehicle information acquisition device 3, an acquisition command together with the vehicle position information to acquire the vehicle information of the detected vehicle (step S14). At this time, the behavior detection unit 15 may transmit various kinds of information regarding the violating vehicle to the storage device 5 and the communication device 6. The various kinds of information may include the detection time, position, speed, and size (dimensions) of the detected vehicle (violating vehicle). The various kinds of information may include a video image in a time period including the detection time. The various kinds of information may include the point cloud information in the time period including the detection time, and a trajectory of movement of the detected vehicle (vehicle position information in time series). The behavior detection unit 15 may also transmit an output command to the output device 4 to give caution, warning, and instruction to the violating vehicle. The behavior detection unit 15 does not transmit the acquisition command to the vehicle information acquisition device 3 when the behavior of the detected vehicle is not determined to be the violation in step S12 (step S13; NO).

Then, the behavior detection unit 15 determines whether all vehicle IDs included in the tracking result have been processed (step S15). When the behavior detection unit 15 determines that not all vehicle IDs have been processed (step S15; NO), the behavior detection unit 15 carries out steps S11 to S15 again for the next vehicle ID. On the other hand, when the behavior detection unit 15 determines that all vehicle IDs have been processed (step S15; YES), the behavior detection unit 15 carries out the behavior information deletion processing (step S16).

In the deletion processing of step S16, as illustrated in FIG. 9, the behavior detection unit 15 performs the processing of step S31 and step S32 for each piece of behavior information registered in the management table. First, the behavior detection unit 15 calculates the difference between the current time and the detection time indicated by the detection time information included in the behavior information, and determines whether the difference is equal to or greater than a predetermined threshold value (step S31). The threshold value is set to, for example, a value greater than the average time required for the vehicle to pass through the detection area Rd. When the behavior detection unit 15 determines that the difference is equal to or greater than the threshold value (step S31; YES), the behavior detection unit 15 deletes the behavior information from the management table (step S32), assuming that the vehicle indicated by the vehicle ID of the behavior information in question has exited the detection area Rd. On the other hand, when the behavior detection unit 15 determines that the difference is less than the threshold value (step S31; NO), the behavior detection unit 15 does not delete the behavior information from the management table.

Then, the behavior detection unit 15 determines whether all the behavior information registered in the management table has been processed (step S33). When it is determined that not all the behavior information has been processed (step S33; NO), the behavior detection unit 15 carries out steps S31 to S33 again for the next behavior information. On the other hand, when the behavior detection unit 15 determines that all the behavior information has been processed (step S33; YES), the behavior detection unit 15 ends the vehicle behavior detection processing. Thus, a series of processing steps of the detection method performed by the detection device 10 is completed.

When the vehicle information acquisition device 3 receives the acquisition command along with vehicle position information from the detection device 10 (behavior detection unit 15), the vehicle information acquisition device 3 acquires the vehicle information. Specifically, when the vehicle present at the position indicated by the vehicle position information enters the monitoring range Rb, the vehicle information acquisition device 3 acquires an image of the license plate by photographing the vehicle so as to include the license plate of the vehicle in question. The vehicle information acquisition device 3 then transmits the vehicle information to the storage device 5 and causes the vehicle information to be stored in the storage device 5, while transmitting the vehicle information to public organizations, road management companies, or the like via the communication device 6.

Thus, the detection system 1 and the detection device 10 detect the target behavior when the detected vehicle M, which is detected on the basis of the point cloud information, moves from the area Rin to the area Rout, and determine that the detected vehicle M is the violating vehicle. Then, the vehicle information of the detected vehicle M is acquired. It should be noted that, in step S25, the behavior detection unit 15 may transmit the vehicle position information to the vehicle information acquisition device 3, as needed, if the behavior detection unit 15 determines that the detected vehicle has been previously determined as the violating vehicle.

Figure 11:
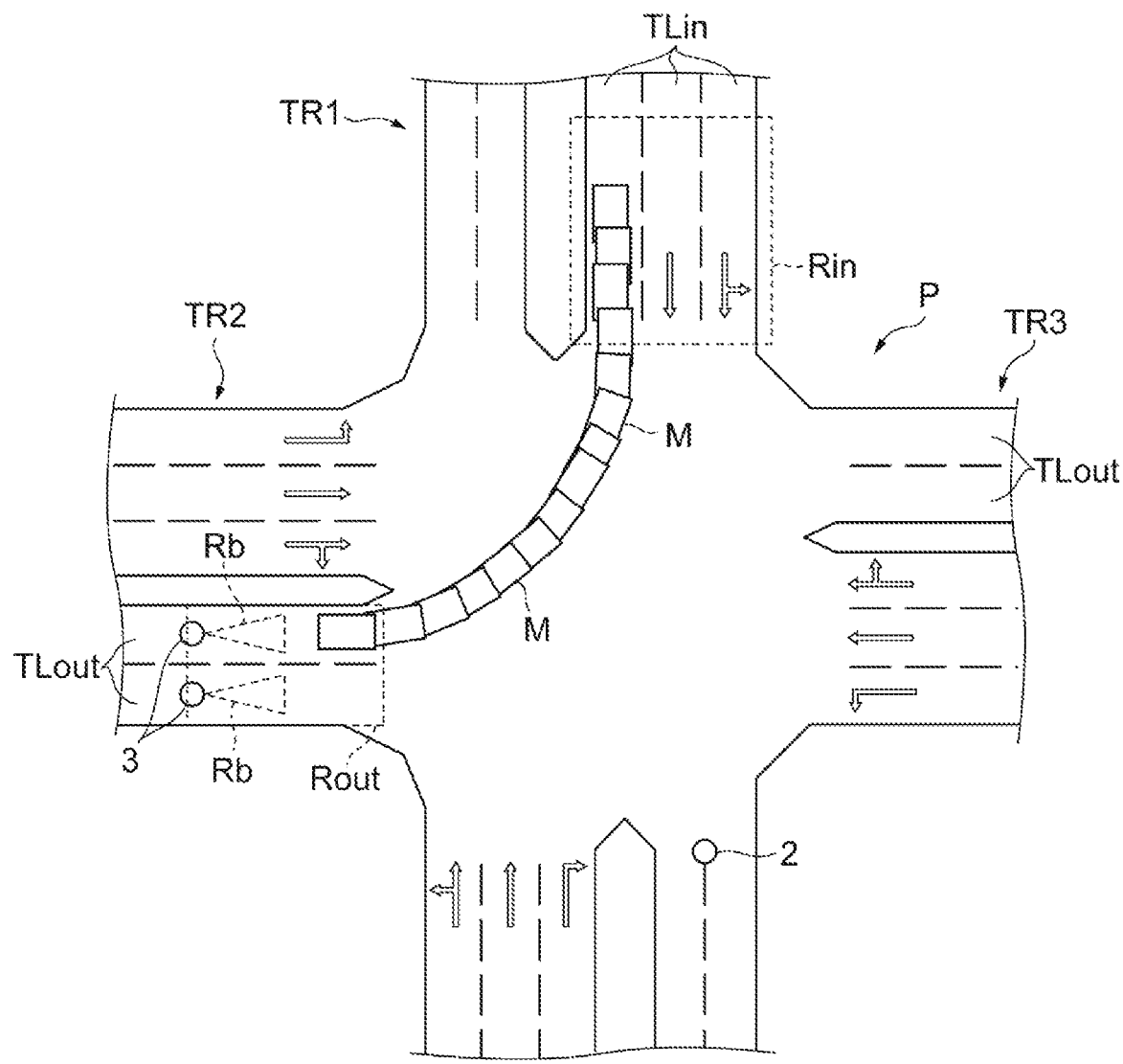
FIG. 11 is a diagram for explaining detection of a right turn.

The target behavior is not limited to the U-turn. For example, as illustrated in FIG. 11, the target behavior may be the right turn at the intersection P where the right turn is prohibited. In this case, the area Rin is set over all lanes TLin entering the intersection P on a road TR1 extending from the intersection P, while the area Rout is set over all lanes TLout exiting the intersection P on a road TR2 ahead of the right turn. The target behavior may also be the left turn at the intersection P where the left turn is prohibited. In this case, the area Rin is set over all lanes TLin entering the intersection P on the road TR1 extending from the intersection P, while the area Rout is set over all lanes TLout exiting the intersection P on the road TR3 ahead of the left turn.

Figure 12:
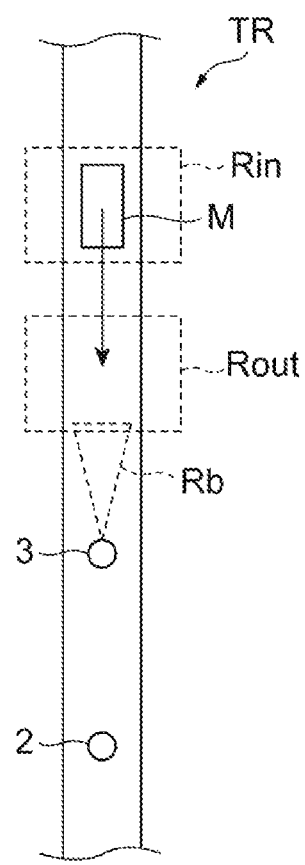
FIG. 12 is a diagram for explaining detection of wrong-way traveling.

As illustrated in FIG. 12, the target behavior may be wrong-way traveling. In this case, the area Rout and the area Rin are set in this order along a direction of traffic of the vehicle permitted for a one-way road TR. In other words, the area Rin and the area Rout are arranged in this order in the direction opposite to the permitted direction of traffic of the vehicle. The area Rin and the area Rout are separated from each other. The separation distance between the area Rin and the area Rout is a distance at which it is possible to prevent false detection of temporary backward traveling as the wrong-way traveling, and is, for example, about 10 meters.

Figure 13:
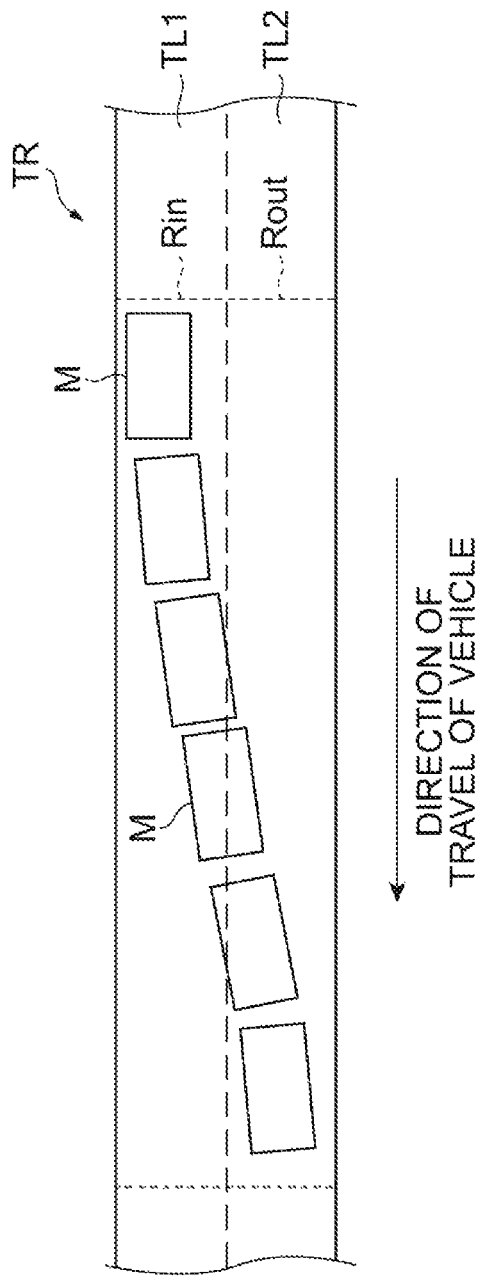
FIG. 13 is a diagram for explaining detection of a lane change.

As illustrated in FIG. 13, the target behavior may be a lane change in an area (section) where the lane change is prohibited. The lane change means the movement of the vehicle from one lane to another. In this case, one road includes a plurality of lanes, the same direction of traffic is permitted for the plurality of lanes, and a line indicating prohibition of the lane change (a yellow line in Japan) is drawn between two adjacent lanes. Each of the areas is set along the line indicating prohibition of the lane change.

In the example illustrated in FIG. 13, the road TR includes two lanes TL1 and TL2 having the same direction of traffic. The area Rin is set in one lane TL1, and the area Rout is set in the other lane TL2. This allows detection of the lane change from one lane TL1 to the other lane TL2. Further, if the lane change from the other lane TL2 to the one lane TL1 is also to be detected, another area Rin may be set additionally in the other lane TL2, and another area Rout may be set additionally in the one lane TL1. Alternatively, instead of the flowchart of FIG. 8, the behavior detection unit 15 may record the area where the detected vehicle M exists in each frame to detect the lane change if the area where the detected vehicle M exists in the current frame is different from the area recorded in the past frame.

Figure 14:
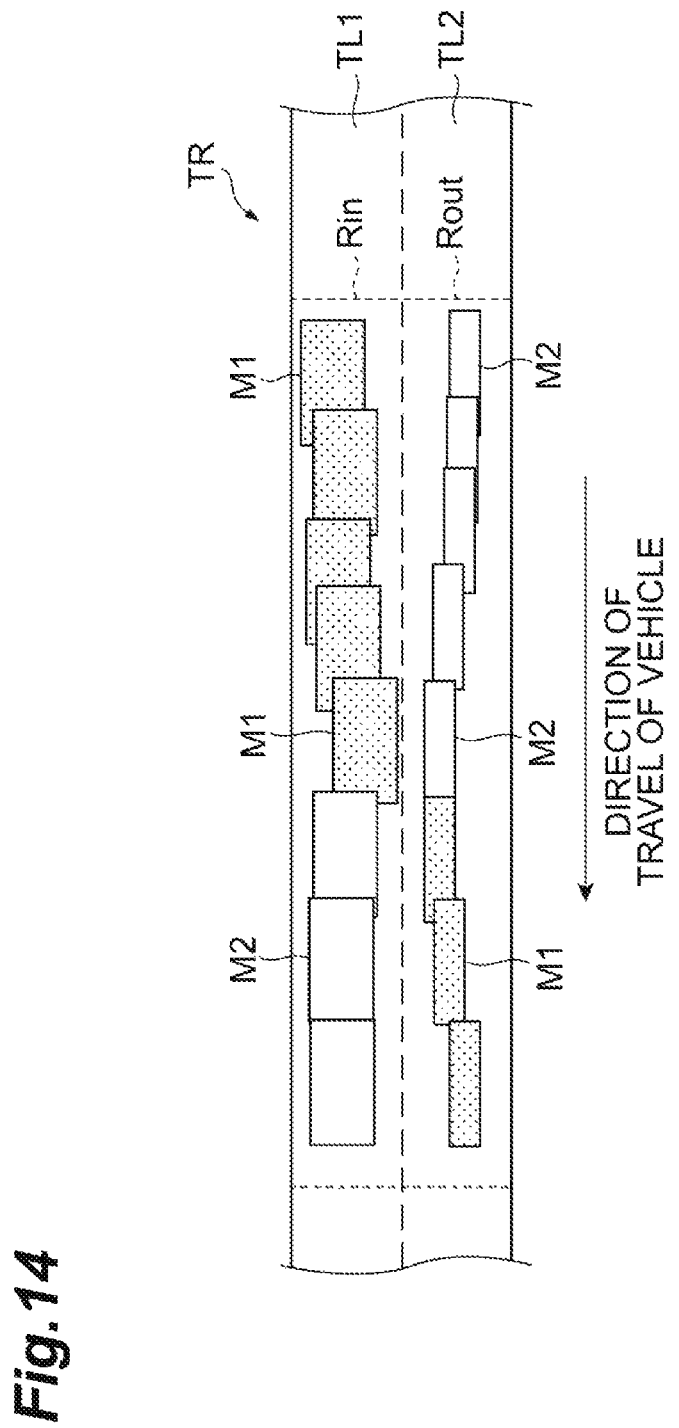
FIG. 14 is a diagram for explaining false detection of a lane change.

When two vehicles are in close proximity to each other in the detection area Rd, the object tracking unit 14 may fail to track the object. For example, as illustrated in FIG. 14, if two vehicles are traveling side by side in different lanes, the object tracking unit 14 may misplace the correspondence of the detected vehicles M1 and M2 when the two vehicles are in close proximity to each other. In such a case, the above detection method can determine that each of the vehicles has made a lane change.

Figure 15A:
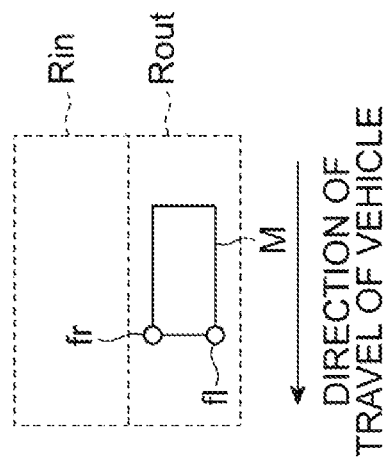
FIGS. 15A to C are diagrams for explaining a modification of detection of a lane change.
Figure 15B:
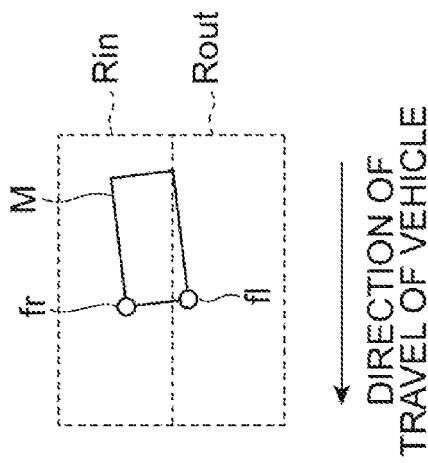
Figure 15C:
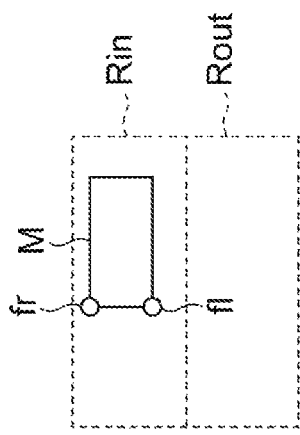
Figure 16:
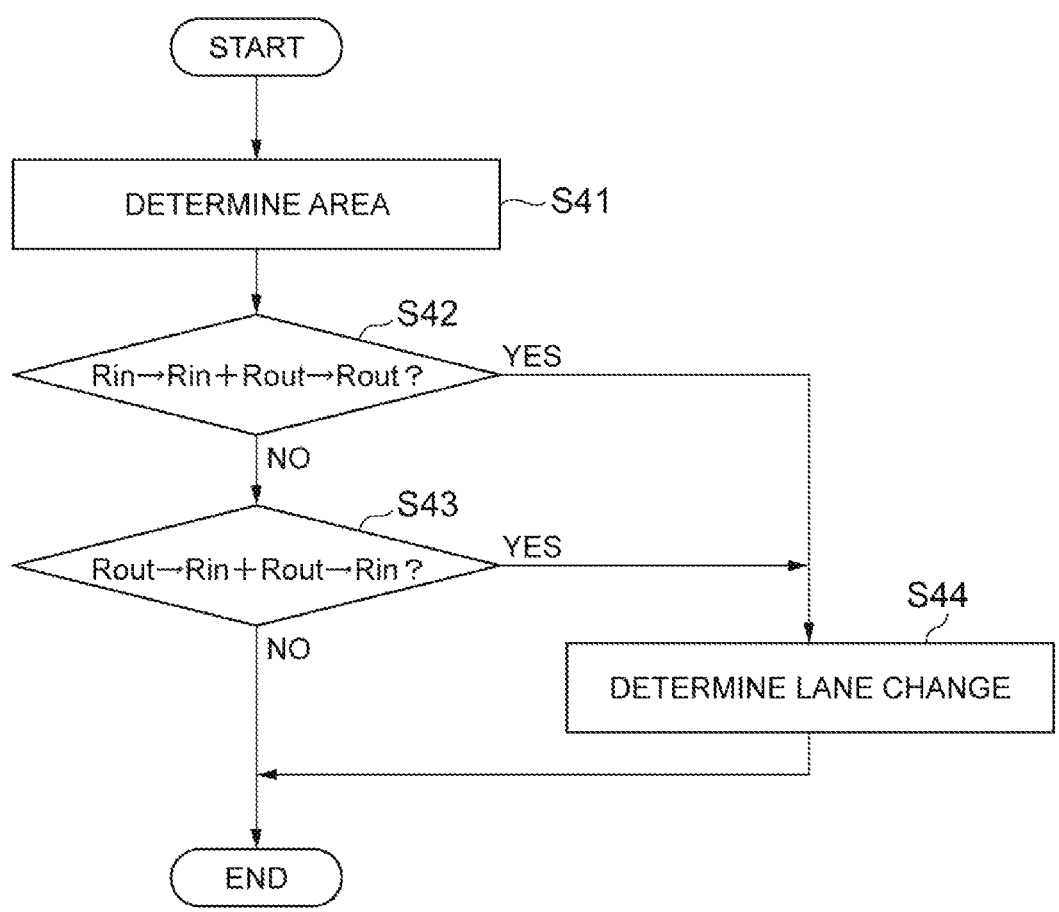
FIG. 16 is a flowchart illustrating in detail the analysis processing in the modification illustrated in FIGS. 15A to C.

With reference to FIGS. 15A to C and FIG. 16, a modification to reduce false detection due to such a tracking error (tracking error) is described. FIGS. 15A to C are diagrams for explaining the modification of detection of a lane change. FIG. 16 is a flowchart illustrating in detail the analysis processing in the modification illustrated in FIGS. 15A to C. In this modification, the object detection unit 13 uses two coordinates in the width direction of the detected vehicle M as the vehicle position information. For example, the object detection unit 13 calculates the coordinates of the front right end fr and the coordinates of the front left end fl of the detected vehicle M as the vehicle position information.

The behavior detection unit 15 determines whether the detected vehicle M exists in the area Rin, whether the detected vehicle M extends over both the area Rin and the area Rout (referred to as "the area Rin+Rout"), and whether the detected vehicle M exists in the area Rout, and detects the lane change according to its transition history. As illustrated in FIG. 15A, when the coordinates of the front right end fr and the front left end fl are both included in the area Rin, the behavior detection unit 15 determines that the detected vehicle M exists in the area Rin. As illustrated in FIG. 15B, when the front right end fr is included in the area Rin and the front left end fl is included in the area Rout, the behavior detection unit 15 determines that the detected vehicle M exists in the area Rin+Rout. As illustrated in FIG. 15C, when the coordinates of the front right end fr and the front left end fl are both included in the area Rout, the behavior detection unit 15 determines that the detected vehicle M exists in the area Rout.

As illustrated in FIG. 16, in the analysis processing (step S12) of this modification, the behavior detection unit 15 first determines the area where the detected vehicle M exists (step S41). As described above, the behavior detection unit 15 determines which of the area Rin, the area Rin+Rout, and the area Rout the detected vehicle M is in, and registers the determined area in the management table. It should be noted that, in the management table of this modification, the behavior information includes the history of the area in which the detected vehicle M has been located, instead of the first entry information and the second entry information. In other words, the behavior detection unit 15 adds information indicating the determined area to the history of the behavior information corresponding to the vehicle ID of the detected vehicle M.

Subsequently, the behavior detection unit 15 determines whether the detected vehicle M has moved in the order of the area Rin, the area Rin+Rout, and the area Rout (step S42). Specifically, the behavior detection unit 15 determines that the detected vehicle M has moved in the order of the area Rin, the area Rin+Rout, and the area Rout, when the areas are registered in the history of the behavior information corresponding to the vehicle ID of the detected vehicle M in the order of the area Rin, the area Rin+Rout, and the area Rout (step S42; YES). In the other cases, the behavior detection unit 15 determines that the detected vehicle M has not moved in the order of the area Rin, the area Rin+Rout, and the area Rout (step S42; NO).

In step S42, when the behavior detection unit 15 does not determine that the detected vehicle M has moved in the order of the area Rin, the area Rin+Rout, and the area Rout (step S42; NO), the behavior detection unit 15 determines whether the detected vehicle M has moved in the order of the area Rout, the area Rin+Rout, and the area Rin (step S43). Similar to step S42, the behavior detection unit 15 determines that the detected vehicle M has moved in the order of the area Rout, the area Rin+Rout, and the area Rin, when the areas are registered in the history of the behavior information corresponding to the vehicle ID of the detected vehicle M in the order of the area Rout, the area Rin+Rout, and the area Rin (step S43; YES). In the other cases, the behavior detection unit 15 determines that the detected vehicle M has not moved in the order of the area Rout, the area Rin+Rout, and the area Rin (step S43; NO).

Then, when the behavior detection unit 15 determines that the detected vehicle M has moved in the order of the area Rin, the area Rin+Rout, and the area Rout (step S42; YES) or in the order of the area Rout, the area Rin+Rout, and the area Rin (step S43; YES), the behavior detection unit 15 determines that the detected vehicle M has made the lane change (step S44) and ends the analysis processing of step S12. On the other hand, when the behavior detection unit 15 determines that the detected vehicle M has not moved in the order of the area Rin, the area Rin+Rout, and the area Rout (step S42; NO) nor in the order of the area Rout, the area Rin+Rout, and the area Rin (step S43; NO), the behavior detection unit 15 ends the analysis processing of step S12.

It is possible that, when one position of the detected vehicle M (e.g., the center point in the width direction) is only used as the vehicle position information, the lane change is determined even when a part of the vehicle temporarily overhangs the adjacent lane. In contrast, the above modification includes the area Rin+Rout that extends over both the area Rin and the area Rout as the area where the detected vehicle M exists, so that the possibility of false determination due to the tracking error can be reduced.

It should be noted that the object detection unit 13 may further classify the detected vehicle M into an automobile or a motorcycle depending on the size of the detected vehicle M. When the vehicle is a motorcycle, the presence of the vehicle in the area Rin+Rout may not be detected due to the small width of the vehicle. To address this, the behavior detection unit 15 may determine in step S42 whether the detected vehicle M has moved in the order of the area Rin and the area Rout, and may determine in step S43 whether the detected vehicle M has moved in the order of the area Rout and the area Rin. Thus, the behavior detection unit 15 may change the determination condition for the lane change according to the type of the detected vehicle M.

The road subjected to lane change detection is not limited to a road having two lanes, and may be a road having three or more lanes. Similar to the lane change between two lanes, a lane change in multiple lanes can be detected.

Figure 17:
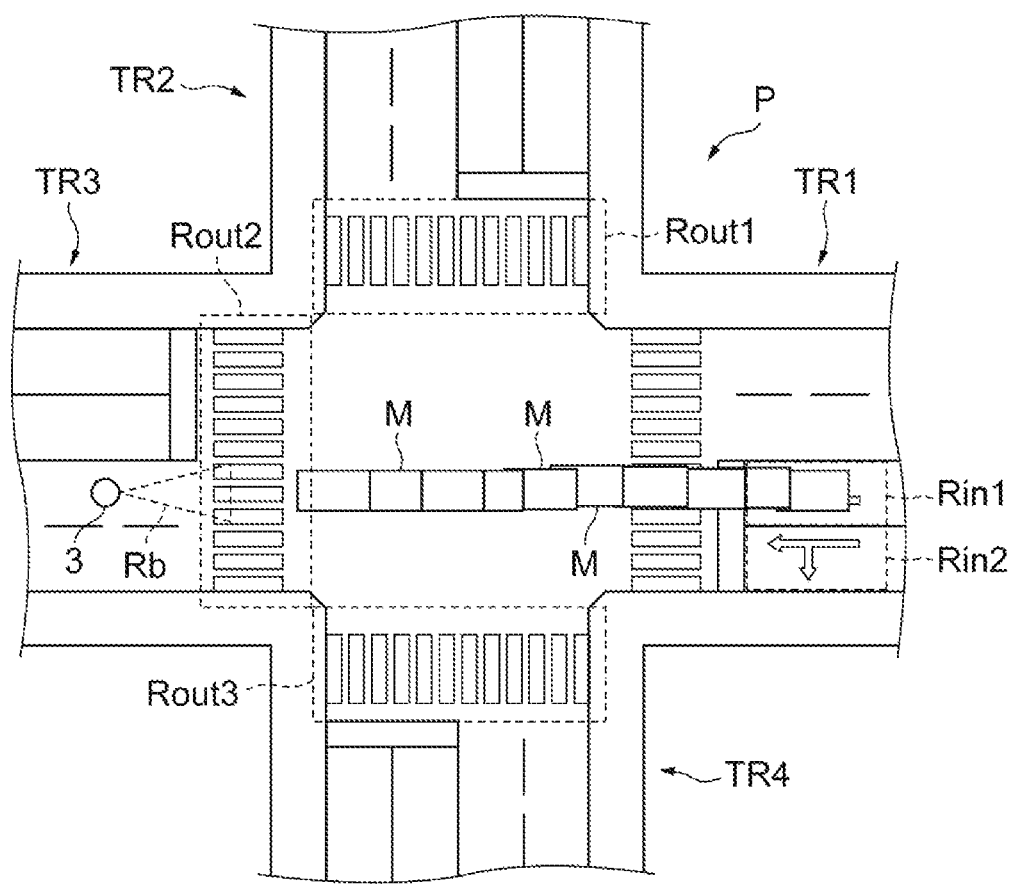
FIG. 17 is a diagram for explaining detection of violation of a designated traffic classification.

The target behavior may be a violation of the designated traffic classification. The violation of the designated traffic classification means the vehicle traveling in a direction other than the direction designated by a road sign or the like. For example, when the vehicle goes straight from the right-turn-only lane, it is the violation of the designated traffic classification. In this case, the area Rin is set for each lane entering the intersection, and the area Rout is set for each lane exiting the intersection. For example, as illustrated in FIG. 17, on a road TR1 extending from the intersection P, an area Rin1 is set for the right-turn-only lane, and an area Rin2 is set for the straight or left-turn-only lane. Further, with respect to the road TR1, an area Rout1 is set on a road TR2 ahead of the right turn, an area Rout2 is set on a road TR3 ahead of the straight traveling, and an area Rout3 is set on a road TR4 ahead of the left turn.

The behavior detection unit 15 detects the violation of the designated traffic classification according to a combination of the area Rin and the area Rout which the detected vehicle M has entered. In the example of FIG. 17, the behavior detection unit 15 determines the violation of the designated traffic classification when the detected vehicle M moves from the area Rin1 to the area Rout2 or to the area Rout3. The behavior detection unit 15 also determines the violation of the designated traffic classification when the detected vehicle M moves from the area Rin2 to the area Rout1. Thus, the detection system 1 and the detection device 10 can also detect the violation of the designated traffic classification.

As described above, the detection system 1 and the detection device 10 detect the detected vehicle M using the point cloud information generated by the laser radar 2. The laser radar 2 is not susceptible to environmental disturbances such as changes in light intensity depending on the time period (morning and night), changes in weather (rainy weather, snowfall, and dense fog), and strong light from sunlight, headlights, and the like. Further, the laser radar 2 can measure the distance between the laser radar 2 and an object with an error of about a few centimeters. Therefore, the detection system 1 and the detection device 10 can detect the position of the detected vehicle M with high accuracy.

The detection system 1 and the detection device 10 detect the target behavior in response to the detected vehicle M moving from the area Rin to the area Rout. In this way, the target behavior can be detected more reliably because the target behavior is detected by the movement from the area Rin to the area Rout regardless of the amount of movement of the vehicle per unit time. For example, by setting the area Rin at the entrance of the intersection and setting the area Rout at the exit of the intersection, it is possible to reliably detect whether the vehicle has travelled straight, or made the right turn or left turn at the intersection. As a result, it is possible to improve the accuracy of detection of the vehicle behavior.

Further, the detection system 1 and the detection device 10 determine the movement from the area Rin to the area Rout using the vehicle position information of the detected vehicle M. By using the vehicle position information, it is possible to simplify the determination as to whether the detected vehicle M has moved from the area Rin to the area Rout. Specifically, whether the detected vehicle M has entered the area Rin can be determined according to whether the position of the detected vehicle M indicated by the vehicle position information is within the area Rin. Similarly, whether the detected vehicle M has entered the area Rout can be determined according to whether the position of the detected vehicle M indicated by the vehicle position information is within the area Rout. In other words, the entry into the area Rin and the area Rout can be determined on the basis of the vehicle position information of one frame, so that the processing load required for the determination can be reduced.

The behavior detection unit 15 determines that the detected vehicle M has moved from the area Rin to the area Rout when the position of the detected vehicle M is included in the area Rin and then included in the area Rout. Thus, the presence of the detected vehicle M in each area is determined according to whether the position of the detected vehicle M is included in each area. This can simplify the determination of the movement from the area Rin to the area Rout.

The behavior detection unit 15 outputs the acquisition command to cause the vehicle information acquisition device 3 to acquire the vehicle information for identifying the vehicle that performed the target behavior when the target behavior is the traffic violation. Thus, the vehicle information for identifying the violating vehicle is acquired. For example, it is possible to impose penalty points on and collect fines from the driver of the violating vehicle. By identifying the violating vehicle, it is also possible to give warning to the driver of the violating vehicle. In a case of driving with a high danger level such as the wrong-way traveling, driving instructions can be given. For example, the driving instructions such as "The vehicle is traveling the wrong way. Make a U-turn immediately" can be given.

Since the laser radar 2 repeatedly irradiates the irradiation possible range Ra (detection area Rd) with laser light, the position of the detected vehicle M can be detected with time. Since the laser radar 2 has a wider detection area Rd than a camera or the like, it is not necessary to install a plurality of laser radars 2. The laser radar 2 can also measure in a space with good visibility such as inside the intersection.

It should be noted that the behavior detection unit 15 may calculate the amount of time the detected vehicle M has stayed in the area Rin based on the number of frames in which the position indicated by the vehicle position information has been included in the area Rin. For example, the behavior detection unit 15 can calculate right-turn waiting time of the right-turning vehicle and obtain statistical information on the right-turn waiting time. Similarly, the behavior detection unit 15 may calculate the stay time during which the detected vehicle M has stayed in the area Rout. Further, by setting the intersection P as one area, the behavior detection unit 15 can calculate the time spent by the detected vehicle M in the intersection P, and also calculate the average time spent by multiple detected vehicles M in the intersection P.

Although the embodiment of the present disclosure has been described above, the present invention is not limited to the above embodiment.

For example, in the above embodiment, the detection device 10 is configured as one device, but may be configured by two or more devices. The detection device 10 may include the laser radar 2. The laser radar 2 may include an information processing device having the function of the detection device 10.

The intersection may be a T-junction. The target point may not be an intersection. The target point may be a confluence point where two or more roads meet, or a confluence point between an exit of a building or other facility and a road. The target point may be a point in the middle of the road. The target point may be set on a public road or on a highway.

The target behavior is not limited to the traffic violation behavior (traveling). For example, the target behavior may be a U-turn in an area where U-turns are not prohibited, a right (or left) turn in an area where right (or left) turns are not prohibited, a lane change in an area where lane changes are not prohibited, normal traveling, a change of course, or the like. The normal traveling means traveling in the permitted direction of traffic of the vehicle on the road (lane). In this case, on the one-way road, the area Rin and the area Rout are set in this order along the permitted direction of traffic of the vehicle. The change of course means to travel obliquely with respect to the direction in which the road extends. The change of course includes the lane change. The area Rin and the area Rout are set for the course change as well as the lane change. In these cases, the detection system 1 acquires statistical information such as the number of vehicles that have performed the target behavior. The detection system 1 may not include the vehicle information acquisition device 3.

The arrangement of the laser radar 2 and the vehicle information acquisition device 3 is not limited to the arrangement illustrated in each drawing. For example, in FIG. 12, the vehicle information acquisition device 3 photographs the wrong-way traveling vehicle from the front side. Since the license plate is also provided on the rear side of the vehicle, the vehicle information acquisition device 3 may be provided so that the wrong-way traveling vehicle can be photographed from the rear side. Alternatively, both the vehicle information acquisition device 3 that can photograph the wrong-way traveling vehicle from the front side and the vehicle information acquisition device 3 that can photograph the wrong-way traveling vehicle from the rear side may be provided.

As the laser radar 2, a three-dimensional laser radar of the type that can irradiate laser light in all surrounding directions may be used. For example, when the target behavior is the U-turn at the intersection, it is possible to detect the U-turn on four roads of the intersection. When the target behavior is the right turn, it is possible to detect the right turn from a plurality of roads extending from the intersection. The detection system 1 and the detection device 10 may detect multiple kinds of target behaviors with the single laser radar 2. In these cases, the number of the laser radars 2 can be reduced because the behaviors of a plurality of vehicles can be detected by the single laser radar 2.

The detection system 1 includes the single laser radar 2, but the detection system 1 may include a plurality of laser radars 2. In this case, the detection device 10 may use combined point cloud information generated by the plurality of laser radars 2. Since this configuration can reduce blind spots, it is possible to improve the reliability of detection.

The vehicle information acquisition device 3 is not limited to the speed violation enforcement device and may be a video camera having a high resolution. The vehicle information acquisition device 3 may further include a light source (also called a flash device or a strobe device) for photographing at night. The vehicle information acquisition device 3 may acquire, for example, the vehicle information (e.g., information written on the license plate) by wireless communication between the communication device 6 and an on-vehicle device.

The vehicle information acquired by the vehicle information acquisition device 3 is not limited to the image of the license plate. The vehicle information may be a facial photograph of the driver of the vehicle. The vehicle information may be electronic information such as the information of the driver license.

When a gate (crossing bar) is installed ahead of the violating vehicle, the detection device 10 may control the gate to be blocked to physically obstruct traveling of the violating vehicle. For example, an electronic toll collection system (ETC) gate is provided on the highway, and the behavior detection unit 15 may control so as to close the ETC gate. This can prevent traveling of the violating vehicle and the violation traveling.

If the detection system 1 and the detection device 10 can intervene in a driving control system of the violating vehicle, the detection system 1 and the detection device 10 may safely stop the violating vehicle.

When the target behavior is the U-turn, the behavior detection unit 15 may calculate the minimum distance between the center of the intersection and the trajectory of the detected vehicle M during the U-turn, as well as the start position of the U-turn. The behavior detection unit 15 may include such information in the various kinds of information regarding the detected vehicle M and transmit the various kinds of information to the storage device 5 and the communication device 6. The U-turn start position is the position of the detected vehicle M when the detected vehicle M leaves the area Rin. It is very dangerous if the vehicle makes the U-turn after entering the intersection and deeply approaching near the center of the intersection, or initiates the U-turn from a position away from the median strip. By adding the above information, it is possible to give, for example, a high penalty to the driver who has made such a highly dangerous U-turn.

The detection device 10 may further include a determination unit that determines whether an emergency vehicle is approaching the target point on the basis of the siren sound of the emergency vehicle or the coordinate information (global positioning system (GPS) information) of the emergency vehicle. For example, the lane change is permitted for yielding the course to the emergency vehicle even in the lane change prohibited area. Therefore, the behavior detection unit 15 may add the information indicating that the emergency vehicle has passed the target point to the various kinds of information regarding the detected vehicle M, and transmit the various kinds of information to the storage device 5 and the communication device 6. The behavior detection unit 15 may not transmit various kinds of information regarding the detected vehicle M while the emergency vehicle is passing through the target point to the storage device 5 and the communication device 6.

Turning right or left or changing lanes without giving an indication of the direction of travel by a directional indicator is a traffic violation (failure to signal violation). In order to detect this traffic violation, the detection system 1 may further include an imaging device such as a video camera. The imaging device transmits the captured image to the detection device 10. The behavior detection unit 15 analyzes the captured image to determine whether the detected vehicle M indicates the direction of travel. Then, the behavior detection unit 15 may determine that the detected vehicle M is the violating vehicle when the behavior detection unit 15 determines that the detected vehicle M having made the right or left turn or the lane change did not give the indication of the direction of travel.

The behavior detection unit 15 may determine that the detected vehicle M has entered the area Rin when the detected vehicle M is present in the area Rin in two or more consecutive frames. The number of frames is set by considering the time normally required for the detected vehicle M to pass the area Rin. The same applies to other areas. In this case, the false detection can be reduced.

Figure 18:
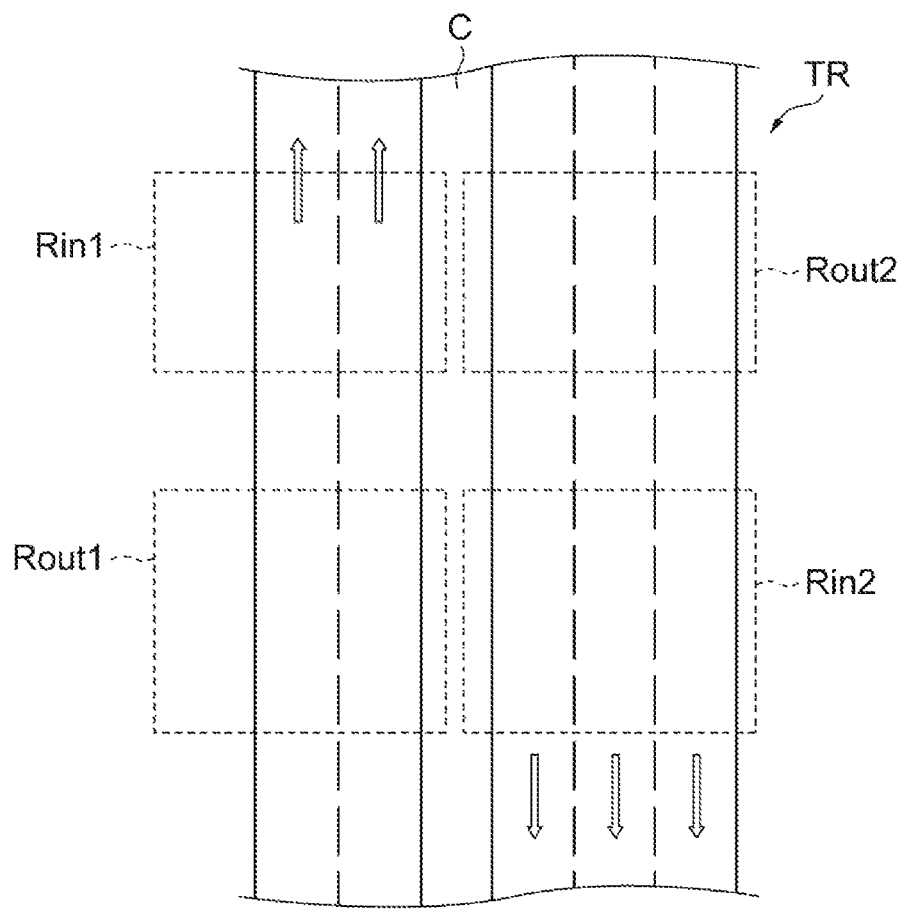
FIG. 18 is a diagram for explaining a modification of detection of the wrong-way traveling.

The road subjected to the detection of the wrong-way traveling may not be the one-lane road, and may be a road having a plurality of lanes. Common areas Rin and Rout are set in lanes having the same permitted direction of traffic. In the example illustrated in FIG. 18, the road TR is divided into two lanes and three lanes by the median strip C. The same direction of traffic is permitted for the two lanes (from bottom to top in FIG. 18), and the same direction of traffic is permitted for the three lanes (from top to bottom in FIG. 18). For the two lanes, the area Rin1 and the area Rout1 are arranged in this order in the direction opposite to the direction of traffic permitted for the two lanes. Similarly, for the three lanes, the area Rin2 and the area Rout2 are arranged in this order in the direction opposite to the direction of traffic permitted for the three lanes. With this configuration, it is possible to detect the wrong-way traveling without increasing the number of laser radars 2 in the lanes having different permitted direction of traffic.

In the above embodiment, the behavior detection unit 15 determines the movement of the detected vehicle M from the area Rin to the area Rout by detecting that the detected vehicle M has been located in the area Rout after the area Rin, but the method of determining the movement from the area Rin to the area Rout is not limited to this embodiment. For example, one or more additional intermediate areas (third areas) may be set between the area Rin and the area Rout in the detection area Rd. The intermediate area means an area through which the vehicle performing the target behavior passes (enters). In this case, the behavior detection unit 15 detects the target behavior in response to the detected vehicle M moving in the order of the area Rin, one or more intermediate areas, and the area Rout. With this configuration, even if the detected vehicle M is determined to be located in the area Rin or the area Rout due to the tracking error or the like, the target behavior is not detected unless it is determined that the detected vehicle M has also been located in the intermediate area. This reduces the false detection, and the accuracy of detection of the target behavior can further be improved.

Figure 19:
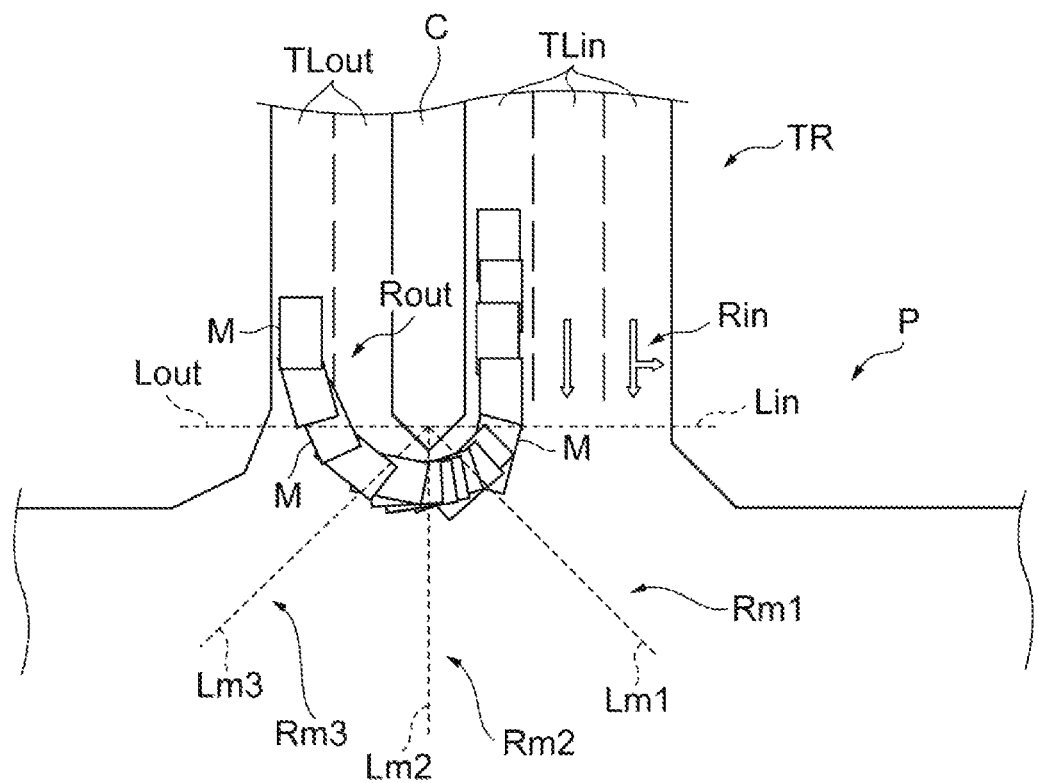
FIG. 19 is a diagram for explaining a modification of detection of a U-turn.
Figure 20:
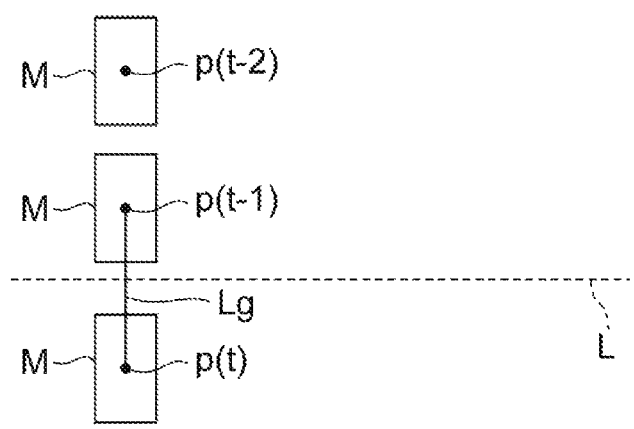
FIG. 20 is a diagram for explaining pass through an area using a detection line.
Figure 21:
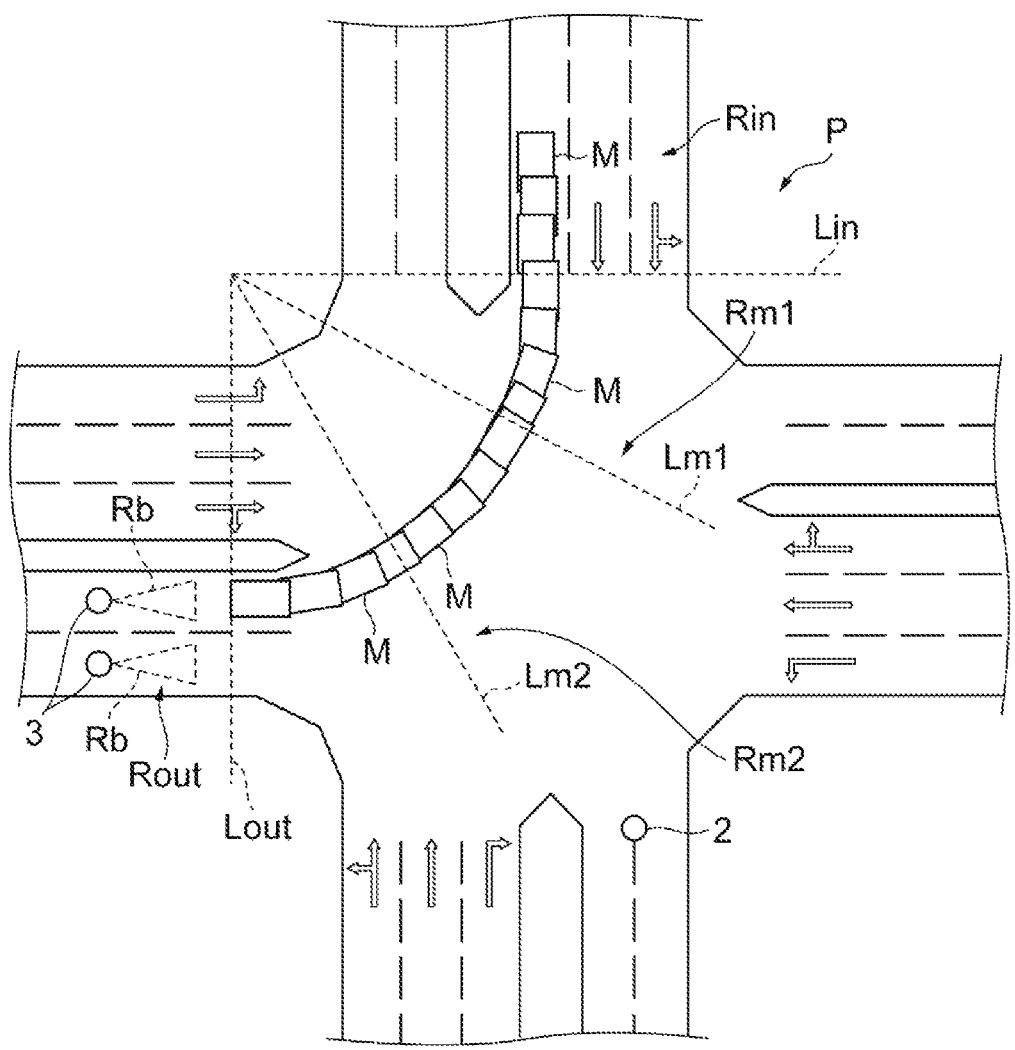
FIG. 21 is a diagram for explaining a modification of detection of the right turn.

As illustrated in FIGS. 19 to 21, a plurality of detection lines may be used. FIG. 19 is a diagram for explaining a modification of detecting the U-turn. FIG. 20 is a diagram for explaining passing through the area using the detection line. FIG. 21 is a diagram for explaining a modification of detecting the right turn.

In the example illustrated in FIG. 19, detection lines Lin (first line), Lout (second line), Lm1, Lm2, and Lm3 are set. The detection line Lin is a line segment set corresponding to the area Rin. The detection line Lin is provided, for example, at the boundary (e.g., a stop line) between the area Rin and the intersection P. The detection line Lout is a line segment set corresponding to the area Rout. The detection line Lout is provided at, for example, the boundary between the area Rout and the intersection P. The detection line Lm1 is a line segment set corresponding to the area Rm1 in the intersection P. The detection line Lm2 is a line segment set corresponding to the area Rm2 in the intersection P. The detection line Lm3 is a line segment set corresponding to the area Rm3 in the intersection P. The areas Rm1 to Rm3 are set in the intersection P and are areas through which the vehicle passes when the vehicle makes a U-turn from the area Rin toward the area Rout. The areas Rm1, Rm2, and Rm3 are arranged in an arc shape in this order from the area Rin toward the area Rout.

In this case, the behavior detection unit 15 determines whether the detected vehicle M has passed (or entered) the area corresponding to the detection line by determining whether the detected vehicle M has crossed the detection line. The behavior detection unit 15 determines whether the detected vehicle M has crossed the detection line using the position of the detected vehicle M indicated by the vehicle position information in the previous frame (time t−1) and the current frame (time t). Specifically, as illustrated in FIG. 20, the behavior detection unit 15 determines that the detected vehicle M has crossed the detection line L when the position p(t−1) of the detected vehicle M in the previous frame is located on one side of the two spaces separated by the detection line L and the position p(t) of the detected vehicle M in the current frame is located on the other side. In other words, if the vehicle position information indicates the position of the center of gravity of the detected vehicle M, the behavior detection unit 15 determines that the detected vehicle M has crossed the detection line L when a line segment Lg connecting the positions of the center of gravity of the detected vehicle M in two consecutive frames intersects the detection line L.

In the example illustrated in FIG. 21, detection lines Lin, Lout, Lm1, and Lm2 are set. Areas Rm1 and Rm2 are set in the intersection P and are areas through which the vehicle passes during the right turn from the area Rin to the area Rout. The areas Rm1 and Rm2 are arranged in this order in an arc shape from the area Rin toward the area Rout. Each detection line may be provided downstream of the corresponding area for detecting the passage of the detected vehicle M through the area corresponding to the detection line, or may be provided upstream of the corresponding area for detecting the entry of the detected vehicle M into the corresponding area. It should be noted that the detected vehicle M needs to enter the area in order for the detected vehicle M to pass the area. Therefore, the behavior detection unit 15 may set the entry information of the area to indicate that the detected vehicle M has entered the area when the behavior detection unit 15 detects the passage of the detected vehicle M through the area. Alternatively, instead of the entry information, passage information indicating whether the detected vehicle M has passed the area may be used.

Thus, the detection line Lin is set for the area Rin and the detection line Lout is set for the area Rout. Further, the detection line is also set for an intermediate area located between the area Rin and the area Rout. The behavior detection unit 15 determines whether the detected vehicle M has crossed each detection line, and determines that the detected vehicle M has passed (or entered) the area corresponding to the detection line when the detected vehicle M has crossed each detection line. For example, the behavior detection unit 15 determines that the detected vehicle M has passed the area Rin when the detected vehicle M has crossed the detection line Lin, and determines that the detected vehicle M has entered the area Rout when the detected vehicle M has crossed the detection line Lout.

In the above embodiment, when the position indicated by the vehicle position information is included in the area Rin, it is determined that the detected vehicle M has entered the area Rin. In this determination method, the entry into the area Rin by the detected vehicle M may not be detected even when the detected vehicle M has passed the area Rin. For example, when the detected vehicle M is traveling at a high speed and the set range of the area Rin is narrow, the detected vehicle M may not be detected in the area Rin even when the detected vehicle M enters the area Rin. On the other hand, the entry into the area (or passing through the area) is determined by using the detection lines in the above modification, so that it is possible to detect the entry into or passing through the each area by the detected vehicle M regardless of the speed of the detected vehicle M and the set range of each area (the area Rin and the area Rout). It is also possible to detect the entry into each area by the detected vehicle M even if the trajectory of movement of the detected vehicle M is complicated.

The determination of the entry into (or passing through) the area can be carried out also for other vehicle behaviors such as left turns, normal traveling, wrong-way traveling, lane changes, and violations of the designated traffic classifications using the detection lines L. In either case, at least two detection lines L (e.g., detection line Lin and detection line Lout) need to be set up. By setting three or more detection lines L, it is possible to reduce the false detection and further improve the accuracy of detection of the target behavior.

For the lane change, one detection line may be set along the boundary between the area Rin and the area Rout. In this case, the behavior detection unit 15 detects the lane change when the detected vehicle M crosses the detection line.

Figure 22:
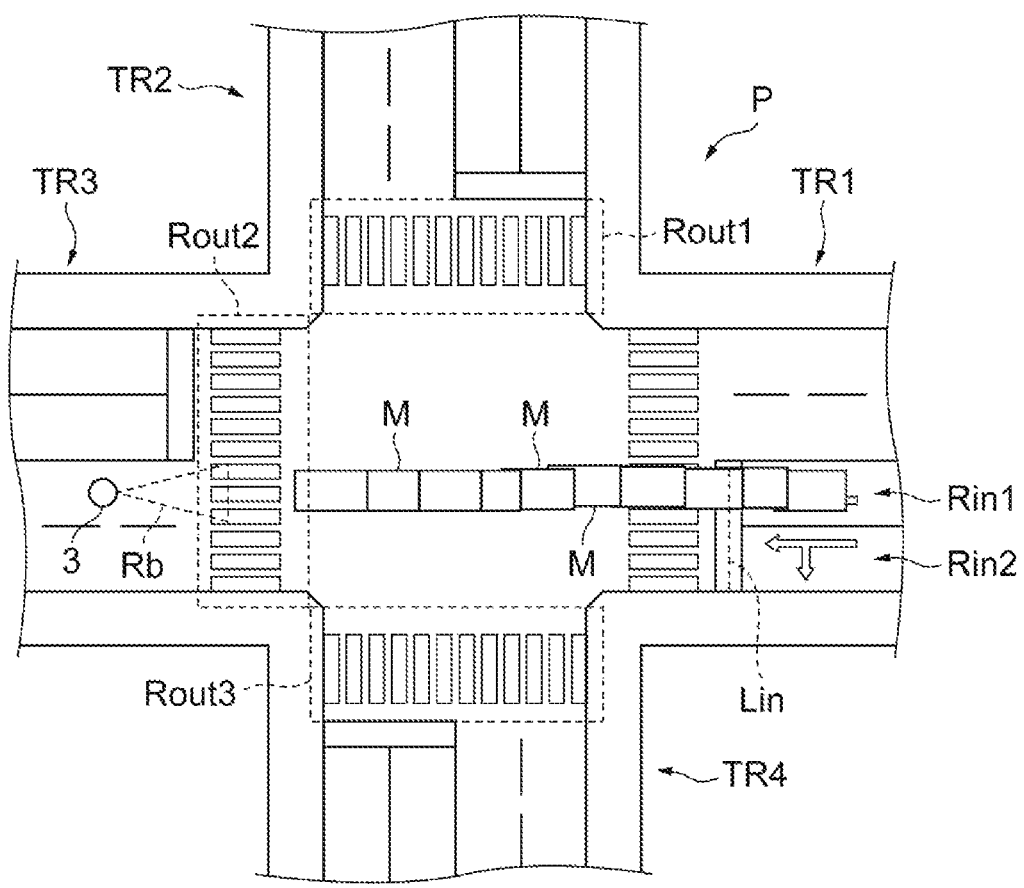
FIG. 22 is a diagram for explaining a modification of detection of the violation of the designated traffic classification.
Figure 23:
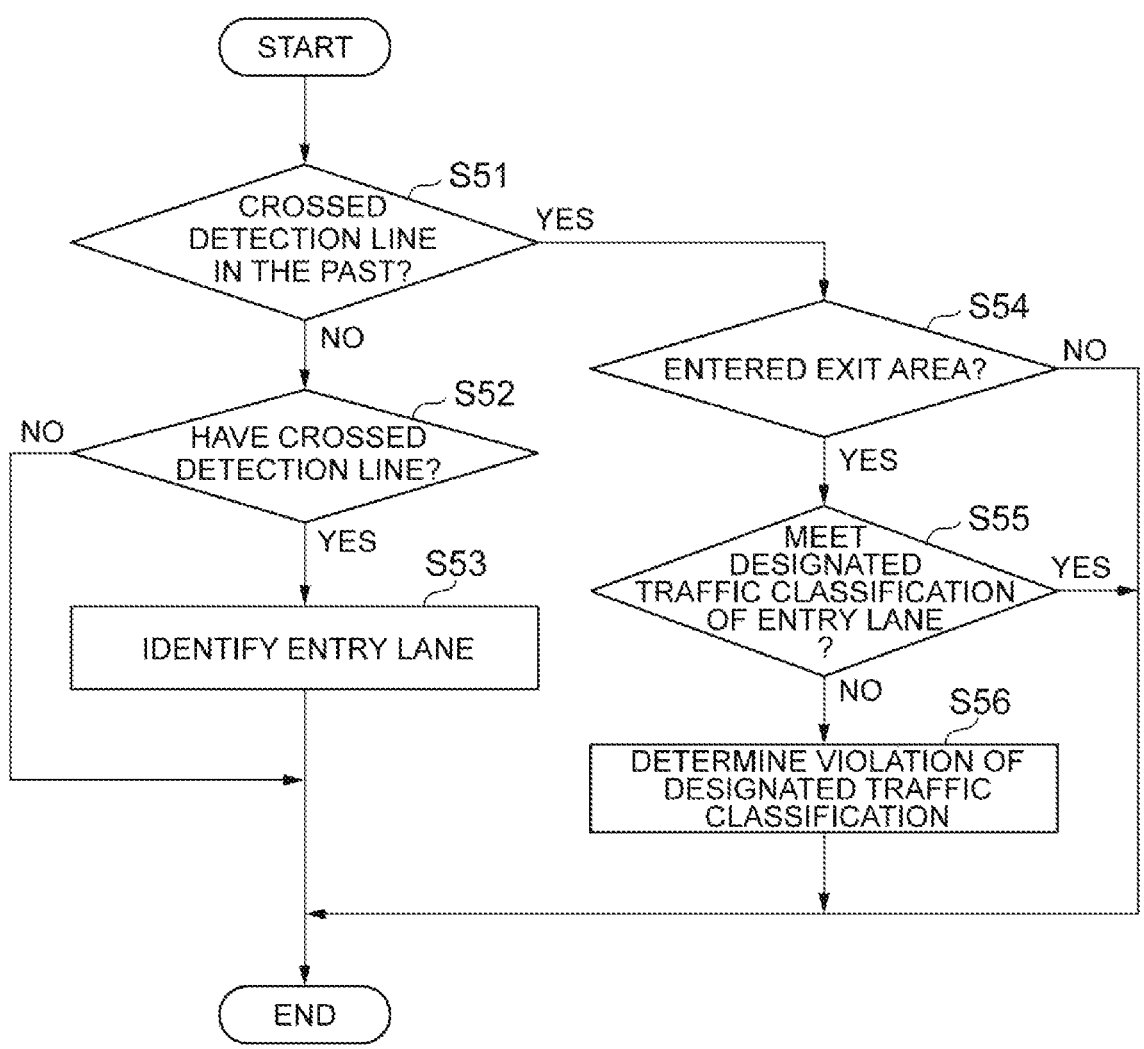
FIG. 23 is a flowchart illustrating in detail analysis processing in the modification illustrated in FIG. 22.

The behavior detection unit 15 may use the detection lines and the areas to determine whether the detected vehicle M has moved from the area Rin to the area Rout. This is descried specifically with reference to FIGS. 22 and 23. FIG. 22 is a diagram for explaining a modification of detection of the violation of the designated traffic classification. FIG. 23 is a flowchart illustrating in detail the analysis processing in the modification illustrated in FIG. 22.

The example illustrated in FIG. 22 differs mainly from the example illustrated in FIG. 17 in that the detection line Lin is set. The detection line Lin is a line segment set corresponding to the areas Rin1 and Rin2. The detection line Lin is set along the stop line of the right-turn-only lane and the straight or left-turn-only lane.

As illustrated in FIG. 23, in the analysis processing (step S12) of this modification, the behavior detection unit 15 first determines whether the detected vehicle M has crossed the detection line Lin by the previous frame (step S51). It should be noted that, in the management table of the present modification, the first entry information is set to "1" when the detected vehicle indicated by the vehicle ID crosses the detection line Lin, and the second entry information is set to "1" when the detected vehicle indicated by the vehicle ID is located in any one of the areas Rout1 to Rout3 (exit area). The behavior detection unit 15 refers to the first entry information of the behavior information corresponding to the vehicle ID of the detected vehicle M, and determines whether the entry into the area Rin has been registered.

When the behavior detection unit 15 determines that the entry into the area Rin has not been registered and that the detected vehicle M has not crossed the detection line Lin by the previous frame (step S51; NO), the behavior detection unit 15 determines whether the detected vehicle M has crossed the detection line Lin between the previous frame and the current frame (step S52). When the behavior detection unit 15 determines that the detected vehicle M has crossed the detection line Lin (step S52; YES), the behavior detection unit 15 identifies the entry lane (step S53).

Specifically, the behavior detection unit 15 identifies the entry lane on the basis of the position of the detected vehicle M indicated by the vehicle position information. For example, the behavior detection unit 15 determines that the entry lane is the right-turn-only lane when the position of the detected vehicle M in the previous frame is included in the area Rin1. Similarly, the behavior detection unit 15 determines that the entry lane is the straight or left-turn-only lane when the position of the detected vehicle M in the previous frame is included in the area Rin2. The behavior detection unit 15 may calculate the coordinates of the cross point between the trajectory of the position of the detected vehicle M and the detection line Lin and identify the entry lane from the coordinates of the cross point.

Then, the behavior detection unit 15 registers the identified entry lane in the management table. In the management table of this modification, the behavior information further includes information indicating the entry lane and information indicating the exit area. In other words, the behavior detection unit 15 sets information indicating the identified entry lane in the behavior information corresponding to the vehicle ID of the detected vehicle M. Then, the behavior detection unit 15 ends the analysis processing of step S12. On the other hand, in step S52, when the behavior detection unit 15 determines that the detected vehicle M has not crossed the detection line Lin (step S52; NO), the behavior detection unit 15 ends the analysis processing of step S12.

In step S51, when the behavior detection unit 15 determines that the entry into the area Rin has been registered and that the detected vehicle M has crossed the detection line Lin by the previous frame (step S51; YES), the behavior detection unit 15 determines whether the detected vehicle M has entered any of the areas Rout1 to Rout3 (step S54). Specifically, the behavior detection unit 15 determines whether the position of the detected vehicle M is included in any one of the areas Rout1 to Rout3 and thus determines whether the detected vehicle M has entered any one of the areas Rout1 to Rout3. When the behavior detection unit 15 determines that the detected vehicle has entered any one of the areas Rout1 to Rout3 (step S54; YES), the behavior detection unit 15 sets the second entry information of the behavior information corresponding to the vehicle ID of the detected vehicle M to a value (here, "1") indicating the entry into the area Rout, as well as setting the information indicating the exit area in which the detected vehicle M has entered.

The behavior detection unit 15 then refers to the management table and determines whether the exit area meets the designated traffic classification of the entry lane (step S55). The lane information on the intersection is preset in the behavior detection unit 15. The lane information includes information about the designated traffic classification of each lane extending from the intersection. When the behavior detection unit 15 determines that the exit area does not meet the designated traffic classification of the entry lane (step S55; NO), the detected vehicle M is determined to be violating the designated traffic classification (step S56). Then, the behavior detection unit 15 ends the analysis processing of step S12.

On the other hand, when the behavior detection unit 15 determines that the detected vehicle has not entered any of the areas Rout1 to Rout3 in the determination of step S54 (step S54; NO), or when the behavior detection unit 15 determines that the exit area meets the designated traffic classification of the entry lane in the determination of step S55 (step S55; YES), the behavior detection unit 15 ends the analysis processing of step S12.

For example, there is a case where, before the vehicle crosses the stop line, the vehicle changes the lane from the right-turn-only lane to the straight or left-turn-only lane, and then goes straight over the stop line. In such a case, in the example illustrated in FIG. 17, it may not be possible to determine from which lane the vehicle has crossed the stop line and entered the intersection P. In contrast, in the above modification, for example, the coordinates of the cross point between the trajectory of the position of the detected vehicle M and the detection line Lin are calculated, so that the entry lane can be identified from the coordinates of the cross point. This allows the entry lane to be accurately identified. As a result, it is possible to improve the accuracy of detection of the designated traffic classification violations.

Alternatively, the detection lines Lout1 to Lout3 may be set in areas Rout1 to Rout3, respectively, and the behavior detection unit 15 may use the detection lines Lout1 to Lout3 to perform the processing of step S54. Instead of the detection line Lin, the detection line Lin1 and the detection line Lin2 corresponding to area Rin1 and area Rin2 may be set, respectively.

REFERENCE SIGNS LIST

1 Detection system
2 Laser radar
3 Vehicle information acquisition device (External device)
4 Output device
5 Storage device
6 Communication device
10 Detection device
11 Acquisition unit
12 Setting unit
13 Object detection unit (Vehicle detection unit)
14 Object tracking unit
15 Behavior detection unit
Lin Detection line (First line)
Lm1, Lm2, Lm3 Detection line
Lout Detection line (Second line)
M, M1, M2 Detected vehicle
Rd Detection area
Rin Area (First area)
Rm1, Rm2, Rm3 Area (Third area)
Rout Area (Second area)

The invention claimed is:

1. A detection device for detecting a target behavior that is a vehicle behavior subjected to detection in a preset detection area using a laser radar that generates point cloud information by irradiating the detection area with laser light and receiving reflected light resulting from the irradiation with the laser light, the detection device comprising:
   an acquisition unit configured to acquire the point cloud information;
   a vehicle detection unit configured to detect a vehicle based on the point cloud information; and
   a behavior detection unit configured to detect the target behavior in response to the vehicle detected by the vehicle detection unit having moved from a first area to a second area, wherein
   the first area and the second area are included in the detection area and are set according to the target behavior,
   the vehicle detection unit calculates coordinates of both ends in a width direction of the vehicle as position information indicating a position of the vehicle based on the point cloud information, and
   the behavior detection unit determines an area in which the vehicle exists using the position information.

2. The detection device according to claim 1, wherein the behavior detection unit determines whether the vehicle has moved from the first area to the second area based on the position information.

3. The detection device according to claim 2, wherein the behavior detection unit determines that the vehicle has moved from the first area to the second area when the position is included in the second area after being included in the first area.

4. The detection device according to claim 2, wherein a first line is set for the first area, and a second line is set for the second area, and
   the behavior detection unit determines that the vehicle has moved from the first area to the second area when the vehicle has crossed the second line after crossing the first line.

5. The detection device according to claim 1, wherein a third area is additionally set between the first area and the second area in the detection area according to the target behavior, and
   the behavior detection unit detects the target behavior in response to the vehicle having moved in an order of the first area, the third area, and the second area.

6. The detection device according to claim 1, wherein when the target behavior is a traffic violation behavior, the behavior detection unit outputs an acquisition command to cause an external device to acquire vehicle information that identifies the vehicle that has performed the target behavior.

7. A detection system, comprising:
   a detection device according to claim 1; and
   a laser radar.

8. The detection device according to claim 1, wherein the behavior detection unit detects a lane change as the target behavior in response to the coordinates of the both ends in the width direction of the vehicle having moved from the first area to the second area.

* * * * *